US011595368B2

(12) United States Patent
Wu et al.

(10) Patent No.: US 11,595,368 B2
(45) Date of Patent: Feb. 28, 2023

(54) SECURE COMMUNICATIONS USING LOOP-BASED AUTHENTICATION FLOW

(71) Applicant: Jonetix Corporation, Cupertino, CA (US)

(72) Inventors: Paul Ying-Fung Wu, Saratoga, CA (US); Richard J. Nathan, Gilroy, CA (US); Harry Leslie Tredennick, Los Gatos, CA (US)

(73) Assignee: JONETIX CORPORATION, Cupertino, CA (US)

( * ) Notice: Subject to any disclaimer, the term of this patent is extended or adjusted under 35 U.S.C. 154(b) by 230 days.

(21) Appl. No.: 16/915,650

(22) Filed: Jun. 29, 2020

(65) Prior Publication Data

US 2021/0051139 A1 Feb. 18, 2021

Related U.S. Application Data

(63) Continuation of application No. 16/263,412, filed on Jan. 31, 2019, now Pat. No. 10,742,622, which is a
(Continued)

(51) Int. Cl.
*H04L 9/40* (2022.01)
*H04L 9/00* (2022.01)
(Continued)

(52) U.S. Cl.
CPC ............ *H04L 63/06* (2013.01); *H04L 9/006* (2013.01); *H04L 9/0827* (2013.01);
(Continued)

(58) Field of Classification Search
CPC ............ H04L 9/32; H04L 9/14; H04L 9/006; H04L 9/30; H04L 63/06
See application file for complete search history.

(56) References Cited

U.S. PATENT DOCUMENTS

| 5,872,517 A | 2/1999 | Hellman |
| 7,552,467 B2 * | 6/2009 | Lindsay ............... G07F 7/1025 713/168 |

(Continued)

OTHER PUBLICATIONS

Yahya et al., "A Shuffle Image-Encryption Algorithm," Journal of Computer Science 4 (12): 999-1002, 2008 ISSN 1549-3636, 2008 Science Publications, 4 pages.
(Continued)

*Primary Examiner* — Khoi V Le
(74) *Attorney, Agent, or Firm* — Marc P. Schuyler

(57) ABSTRACT

A first party uses a secret key to encrypt information, which is then sent through an untrusted connection to a second party. The second party, however, cannot decrypt the information on its own, and it relays the encrypted information through a secure network. The secure network includes one or more nodes linking the first and second parties through one or more trusted connections ("hops"); each hop features uses of a shared secret key unique to that hop. The first party's connection to the network (domain) receives the information relayed through the secure network by the second party, it decrypts that information according to the secret key of the first party, and it then retransmits the decrypted information to the second party using the secure hops. Techniques are provided for sharing a private session key, federated credentials, and private information.

20 Claims, 15 Drawing Sheets

Related U.S. Application Data continuation of application No. 15/063,487, filed on Mar. 7, 2016, now Pat. No. 10,263,779.

(60) Provisional application No. 62/286,335, filed on Jan. 23, 2016, provisional application No. 62/272,001, filed on Dec. 28, 2015, provisional application No. 62/256,596, filed on Nov. 17, 2015, provisional application No. 62/232,043, filed on Sep. 24, 2015.

(51) Int. Cl.
| | | |
|---|---|---|
| *H04L 9/14* | (2006.01) | |
| *H04L 9/30* | (2006.01) | |
| *H04L 9/32* | (2006.01) | |
| *H04L 9/08* | (2006.01) | |

(52) U.S. Cl.
CPC .......... *H04L 9/0836* (2013.01); *H04L 9/0841* (2013.01); *H04L 9/14* (2013.01); *H04L 9/30* (2013.01); *H04L 9/32* (2013.01); *H04L 9/3268* (2013.01); *H04L 63/0435* (2013.01); *H04L 63/0815* (2013.01); *H04L 2209/56* (2013.01)

(56) References Cited

U.S. PATENT DOCUMENTS

| | | | |
|---|---|---|---|
| 8,627,084 | B1 | 1/2014 | Pauker et al. |
| 9,178,701 | B2 * | 11/2015 | Roth ........................ H04L 9/083 |
| 9,208,491 | B2 | 12/2015 | Spies et al. |
| 9,489,521 | B2 | 11/2016 | Martin et al. |
| 9,635,011 | B1 | 4/2017 | Wu |
| 10,021,085 | B1 | 7/2018 | Wu et al. |
| 2002/0123972 | A1 | 9/2002 | Hodgson et al. |
| 2003/0182552 | A1 * | 9/2003 | Tanimoto ............... H04L 9/3265 |
| | | | 713/170 |
| 2005/0147244 | A1 | 7/2005 | Molovyan et al. |
| 2006/0034456 | A1 | 2/2006 | McGough |
| 2007/0233540 | A1 * | 10/2007 | Sirota ................... H04L 63/105 |
| | | | 705/7.29 |
| 2007/0234410 | A1 * | 10/2007 | Geller ...................... G06F 21/41 |
| | | | 726/8 |
| 2009/0132813 | A1 * | 5/2009 | Schibuk ............ G06Q 20/4014 |
| | | | 726/9 |
| 2011/0131635 | A1 | 6/2011 | Schneider |
| 2013/0103685 | A1 | 4/2013 | Preneel et al. |
| 2013/0251150 | A1 | 9/2013 | Chassagne |
| 2014/0192809 | A1 | 7/2014 | Park |
| 2014/0304825 | A1 | 10/2014 | Gianniotis et al. |
| 2014/0344164 | A1 | 11/2014 | Pauker et al. |
| 2015/0199684 | A1 * | 7/2015 | Maus ................. G06Q 20/3829 |
| | | | 705/71 |
| 2016/0378949 | A1 * | 12/2016 | Fu ......................... G06F 40/166 |
| | | | 705/2 |
| 2017/0310475 | A1 * | 10/2017 | Hu ...................... H04L 63/0869 |

OTHER PUBLICATIONS

"Streamlining Information Protection Through a Data-centric Security Approach," Hewlett-Packard Company White Paper, www.voltage.com, 2015 Hewlett-Packard Development Company, L.P., 16 pages.
Notice of Allowance, U.S. Appl. No. 15/461,384, dated Apr. 10, 2018, 20 pages.
Notice of Allowance and interview summary, U.S. Appl. No. 14/831,070, dated Mar. 15, 2017, 23 pages.
Wikipedia entry, "Kerberos (procotol)," Aug. 15, 2018, 7 pages.
Wikipedia entry, "Transport Layer Security," Aug. 15, 2018, 33 pages.
Notice of Allowance U.S. Appl. No. 16/004,181, dated May 13, 2019, 17 pages.
Notice of Allowance U.S. Appl. No. 15/063,487, dated Jul. 9, 2018, 12 pages.

* cited by examiner

601

| FIELD | TYPE |
|---|---|
| SSN | FED |
| Passport Number | FED |
| Driver's License Number | FED |
| Visa CCN | FED |
| AMEX CCN | FED |
| MC CCN | FED |
| Discover CCN | FED |
| CCN Exp (MM/YY) | FED |
| CCV | FED |
| Account Number | FED |
| Web Domain | FED |
| Redress | FED |
| Other | FED |

| FIELD | TYPE |
|---|---|
| Home Street Address | PVT |
| Residence City | PVT |
| State | PVT |
| Zip | PVT |
| Country | PVT |
| Phone | PVT |
| Mother's Maiden Name | PVT |
| Home Phone | PVT |
| Cell | PVT |
| Company Name | PVT |
| Business Street Address | PVT |
| Business City | PVT |
| Business State | PVT |
| Business Zip | PVT |
| Business Country | PVT |
| Business Phone | PVT |
| Password | PVT |
| Login Name | PVT |
| DOB | PVT |
| Payment Token | PVT |
| YYYYMMDDHHMMSSSS | PVT |
| Session ID/WF Field ID | PVT |
| Qty | PVT |
| Challenge1 | PVT |
| Challenge2 | PVT |
| Comment | PVT |
| Other | PVT |

| Root/Avatar System Identifier | | Client Unique ID | Sender IP | Destination IP | Destination Unique ID |
|---|---|---|---|---|---|
| Time code | Fd/Ss ID | Other info | Avatar type | | Avatar payload |

SECURE COMMUNICATIONS USING LOOP-BASED AUTHENTICATION FLOW

1. CROSS-REFERENCE TO RELATED APPLICATIONS

This disclosure is a continuation of U.S. Utility application Ser. No. 16/263,412, filed on Jan. 31, 2019 on behalf of first-named inventor Paul Ying-Fung Wu for "Secure Communications Using Loop-Based Authentication Flow," which in turn is a continuation of U.S. Utility application Ser. No. 15/063,487, filed on Mar. 7, 2016 on behalf of first-named inventor Paul Ying-Fung Wu for "Secure Communications Using Loop-Based Authentication Flow" (now U.S. patent Ser. No. 10/263,779), which in turn, claims priority to U.S. Provisional Patent Application Nos. 62/286,335, filed on Jan. 23, 2016 on behalf of first-named inventor Paul Ying-Fung Wu for "Techniques For Secure Exchange Of Credentials And Private Information," 62/232,043, filed on Sep. 24, 2015 on behalf of first-named inventor Paul Ying-Fung Wu for "Improved Secure Credentials Exchange, Related Methods, Devices & Systems," 62/272,001, filed on Dec. 28, 2015 on behalf of first-named inventor Paul Ying-Fung Wu for "Techniques For Secure Credentials Exchange," and 62/256,596, filed on Nov. 17, 2015 on behalf of first-named inventor Paul Ying-Fung Wu for "Improved Secure Credentials Exchange, Related Methods, Devices & Systems." The aforementioned patent applications are each hereby incorporated by reference, as is U.S. Utility patent application Ser. No. 14/831,070, filed on Aug. 20, 2015 on behalf of first-named inventor Paul Ying-Fung Wu for "Encryption And Decryption Techniques Using Shuffle Function."

2. BACKGROUND

Despite increasingly pervasive use of complex passwords and cryptographic authentication and encryption measures, both enterprises and individuals continue to be at significant risk for information theft and computer fraud. A contributing factor to this fraud is the fact that in many transactions, the parties to the transaction are typically not personally known to one another and one party or both parties rely on presentation of a federated credential to infer identity (e.g., a recipient presumes that a party presenting a credential such as, a credit card number, driver's license number, social security number, account name or number, company name, etc., is in fact authorized to use that credential).

For example, in a typical purchase scenario, a first party presents a credit card to a second party, and the second party then decides whether it can trust that the first party really owns that credit card; the second party in this example sometimes requires added security measures in the form of one or more authentication checks (e.g., by requesting that one presenting a credit card also further the card owner's statement address zip code, card verification value or "CCV," or other information), and it then electronically verifies provided values and presumes that the first party is authorized to use the credential if each requested secondary authentication value is correctly presented.

Despite these measures, the risk of fraud is still present, and a number of attacks can be mounted in such a system, including attempts to hack the electronic systems of the various parties, attempts to eavesdrop and/or replay information submission, and in other manners. Once the credential and any associated authentication secret is discovered, a thief can potentially commit fraud for a period of time until the fraud is discovered and the credential revoked, often through painstaking procedures.

What are needed are techniques for independently authenticating a party presenting a credential or secret information where that information will be received, stored or used in an electronic setting. The present invention addresses these needs and provides further, related advantages.

3. BRIEF DESCRIPTION OF THE DRAWINGS

FIG. 6A is an exemplary list of federated credentials that might be associated with a typical transaction; the list represents a set of discrete fields, each having a field type of "federated credential" ("FED"). These fields can be processed by client and/or system software according to the flow of FIG. 5C.

FIG. 6B is an exemplary list of private information fields that might be associated with a typical transaction; here also, the list represents a set of discrete fields, each having a field type of "private information" ("PVT"). These fields can be used by client and/or system software according to the flow of FIG. 5B.

FIG. 6C shows an avatar packet, including a number of headers and other information used by various system components.

Figure 1:
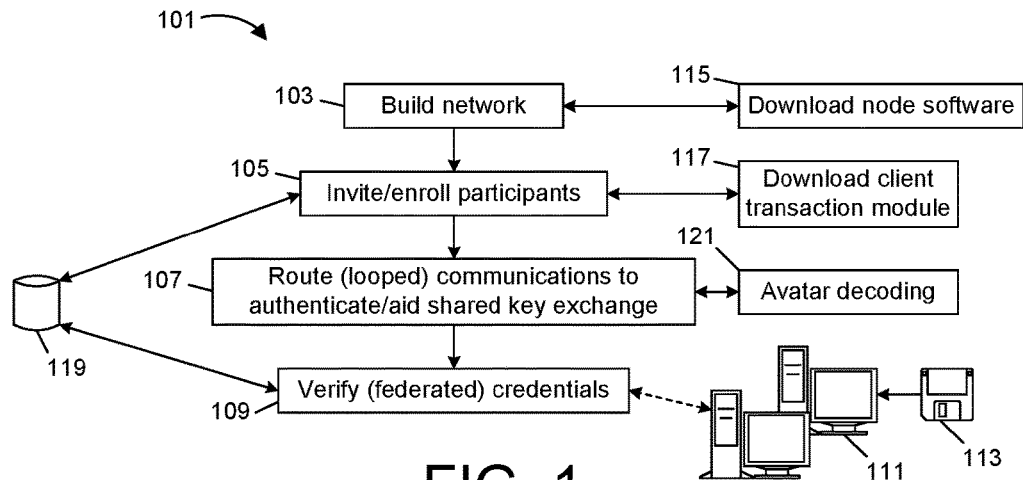
FIG. 1 is an illustrative diagram showing elements of a system for providing independent path authentication of credentials or other information using a trusted, secure network.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application. Without limiting the foregoing, this disclosure provides several different examples of techniques used to communicate keys, credentials and various other types of information. The various techniques can be embodied as software, in the form of a computer, device, service, cloud service, system or other device or apparatus, in the form of data encrypted as a result of these techniques, or in another manner. While specific examples are presented, the principles described herein may also be applied to other methods, devices and systems as well.

4. DETAILED DESCRIPTION

This disclosure provides devices, methods, systems and components of these things for addressing the aforementioned problems through the use of loop-based authentication flow. A client seeking to securely communicate with another entity transmits an avatar to that other entity. This "avatar" comprises information that, on its own, cannot be used by the other entity, but once remotely decoded according to the principles herein, serves to provide the information and/or authentication of the client via a trusted, secure network. As will be further described below, this avatar can be used for key exchange, transmission and authentication of federated credentials, and to convey private information in a manner decipherable by only the intended recipient. These techniques address the problems alluded to above, because these techniques provide means for (a) authenticating a party presenting a federated credential as a true owner of that credential, thereby reducing the potential for credit card fraud and other types of fraud, and (b) providing for decryption of encrypted information in a manner resilient to eavesdropping or "man-in-the-middle" attacks. As should therefore be apparent, these techniques provide a more secure mechanism for online communication and for effectuating electronic transactions.

More particularly, a secure network is first constructed where every node in the network is connected to a neighbor node by use of a symmetric key encryption and/or authentication system. When a first entity (e.g., "Bob") desires to communicate directly with a second entity (e.g., "Acme"), the first entity sends an avatar to the second entity; note that in many instances, this transmission is via untrusted means (for example, via Bluetooth connection or via the Internet). The avatar is at least partially encrypted by Bob's machine using the symmetric key that machine uses for its connection to the secure network; Acme cannot decrypt this avatar on its own, because Acme does not have access to that key. However, because every connection in the secure network is trusted, and because Acme is also a part of this secure network, Acme can route the avatar through the secure network to Bob's domain server for the secure network, which can then decrypt that avatar using the shared key originally used to encrypt the avatar; the secure network then securely returns this information back to Acme using node-to-node encryption using the shared (different) keys used to secure each "hop" of the secure network. Acme is able to decrypt the information sent to it by its domain server using the shared secret key it shares with that server. Acme can then process the information, or provide related services.

Several different use models are supported by this architecture. First, this architecture can be used to create a special key known only to Bob and Acme; this key, referred to as a private session key (or "PSK"), is generated in a manner where neither the secure network nor an eavesdropper can feasibly intercept or derive this key. Second, this architecture can be used to securely share private information using the PSK, in a manner where only the second entity (e.g., Acme) can decrypt the information. Third, this architecture can be used in a manner that permits sharing of a federated credential, in a manner where the federated credential is securely communicated and is also authenticated by a trusted third party, who can determine if the federated credential is being presented by someone other than its owner (e.g., Bob) or is otherwise being used in an unauthorized or atypical manner.

Each of these use models will be discussed in detail below. It should first be noted that whichever model(s) is(are) used, the techniques described herein can be embodied in a number of manners. First, these techniques can be embodied as a method, device, collection of devices, software or a combination of these things practiced by a first entity (e.g., Bob); for example the techniques presented herein can be embodied as a software application for installation on Bob's smart phone, where that software application will cause Bob's smart phone to interact with a secure network, and also to communicate information with (e.g., send avatars to or receive information from) a second entity (e.g., Acme). Second, these techniques can be embodied as a method, device, collection of devices, software or a combination of these things practiced by a second entity (e.g., Acme); for example, the techniques presented herein can be embodied as a software application for installation on a computerized point-of-sale terminal or server (e.g., a computer) of Acme, where that software application will cause Acme's computer to communicate information with (e.g., receive avatars from or send information to) a first entity (such as Bob), to forward avatars to a secure network and to receive returns of information from the secure network responsive to those forwarded avatars. Third, the described techniques can also be embodied in the form of a node (e.g., a server) in the secure network (or software for controlling such a node), for example, that receives avatars from a first source (e.g., Acme), and forwards those avatars through the secure network for decoding at a remote destination and that subsequently forwards returns of information back to the first source (e.g., using shared keys on a node-to-node basis). Fourth, the described techniques can be embodied at a connection point for the secure network, for example, as software used to control the domain server (e.g., network node) that connects Bob to the network; such a node as mentioned shares a secret key with Bob and shares a secret key with at least one other destination on the network, and it receives routed, forwarded avatars (e.g., received by Acme from Bob and routed through the secure network), decodes those avatars, and then sends return transmissions to Acme. Fifth, these techniques can also be embodied in the form of a trusted third party such as referenced above. Such a party maintains a registry associated with secure credentials (e.g., Bob's credentials) that can be used to detect unauthorized use. For example, if an attempt is made to forward one of Bob's credentials through the secure network, but the credential is routed to or from an unknown device (not previously associated with Bob) or is not routed using a unique identifier for Bob (such as Bob's email address), this trusted third party can take various actions such as blocking the communication, notifying Bob, Acme, police or others, requiring additional security measures, delaying communications, asking Bob to enroll a new device or, potentially, other types of actions. The techniques presented herein can be embodied as a collection of devices, a system, or in another form.

The specific use models cited above will now be further introduced. It should be assumed that Bob wishes to provide information in a manner that will use a secure network for purposes of both delivery and authentication; it could be that Bob uses his device to visit a web site or physical site, and he wishes to exchange information with that site (e.g., to make a purchase, submit an application, verify Bob's identity, or for some other purpose). It is assumed for purposes of discussion that this web site or physical site is at least partially manifested as a machine (e.g., a computer, acting as a destination device) and that Bob will directly interact with the site via untrusted means; the untrusted means can be via people (e.g., untrusted employees at the physical site, over the open Internet, via local area communication such as Bluetooth or unsecured wireless, etc.). The destination device or its owner informs Bob that Bob should join the secure network in order to present this information; Bob then visits the secure network on his own, is redirected to the secure network by Acme, or Acme has the secure network contact Bob in order to add Bob's device to the network. In one embodiment, Bob provides his email address to Acme, which then submits this email address to the secure network, and the secure network arranges with Bob to register Bob's device on the network. In another embodiment, Acme provides Bob with a web link (e.g., based on a 2-D bar code) and Bob is directed to a registration page with the secure network. It is also possible for Bob to already be a member of the secure network and for Bob to prompt Acme to join the secure network, in the manner just described. Whichever route is used, if Bob and Acme are not already members of the secure network, Bob and Acme enroll in the secure network which provides processes for (a) assigning or selecting a unique ID for Bob or Acme (e.g., an email address or other identifier), (b) pairing a specific device of Bob or Acme with a domain that forms a connection to the secure network (i.e., using a shared (i.e., symmetric) secret key, set up via private-public key techniques, to thereby set up a trusted connection), and (c) optionally registering Bob and/or Acme in a manner where each device enrolled by that party and that party's unique ID are registered in explicit association with one or more federated credentials, such as credit cards, account numbers, state or federal IDs, social security numbers, taxpayer IDs, redress numbers, and so forth. As used herein, a "federated credential" is a piece of information that a first entity will share with a second entity where the piece of information will serve as a status, representation or authorization on behalf of the first party. Note that, depending on the type of credential, the piece of information does not always need to be uniquely associated with a single individual; for example, the information "Vice-President of Acme" if authenticated can be used to denote that a particular individual has authority to bind Acme to a contract or representation, and there may be multiple such individuals who have the same credential and associated authority. The same can be true of (in some instances) a company credit card, a credit card shared by husband and wife, and so forth. Other types of credentials, such as social security number, will be uniquely associated with a single individual.

Note that the secure network is typically established and managed in such a manner where every entity is known to every other entity via a chain of trusted connections or hops, each predicated on the use of a shared secret key as described above (used to encrypt communications between two nodes in the secure network). Thus, Bob is known to a connection node to the secure network because each enrolled device of Bob has a unique shared key that (barring compromise) is only used for communication between Bob and this connection node. The connection node examines headers used for communications to/from Bob and verifies that Bob's enrolled device is indeed the destination/source of associated communications. In turn, that connection node connects to a second node of the network and uses a shared secret key to encrypt all communications in a manner unique to this trusted connection (i.e., to connect this pair of nodes); the connection node can only decrypt communications from the second node using this (second) shared secret key, the second node can only decrypt communications from Bob's connection node using this (second) shared secret key, and this (second) shared secret key is not used for communications with any other device or network connection. Similarly, this second node examines headers used for communications and verifies that Bob's connection node was indeed the source of communications decrypted using this (second) shared secret key; in one embodiment, each node of the secure network is provided with an updated full map of the secure network, such that verification can be performed from end-device origin and destination information. These processes can be extended to any number of nodes of the secure network, i.e., such that absolute confidence can be placed at any node in the secure network that communications purporting to be from Bob in fact originated from Bob, because every relay of this information (i.e., every "hop") within the secure network is effectively trusted. The same is true for each machine Acme couples to the network, i.e., each is enrolled in the network and uses a shared secret key to communication with its domain.

For the first use model alluded to above, it is assumed that a first entity (e.g., "Bob") wishes to generate a private session key ("PSK") that will be shared with a second entity (e.g., "Acme"). It is assumed for purposes of this discussion that Bob and Acme are already members of a secure network such as described above, i.e., while Bob and Acme can communicate with each other through an untrusted connection (e.g., as exemplified above), Bob and Acme are also linked by a chain of trusted connections through the secure network with each link or hop in the chain predicated on a shared, secret, symmetric key unique to that connection pair. Note in connection with the discussion below that various references will be made to "Diffie-Hellman key exchange" (and feature use of the well-known logarithmic scripts A, B, $G^A$, $G^B$ and $G^{AB}$); however, it should be understood that despite the use of these scripts, any conventional secret key exchange methodology can be used (e.g., predicated on elliptic-curve cryptographic techniques).

In this example, in connection with Bob's electronic communication with Acme (e.g., direct, or through an unknown, potentially untrustworthy or insecure source such as the Internet), software on Bob's device generates a piece of secret information known only to Bob. This secret information is optionally based on the shared secret key that Bob uses for communications with his domain; for example, in one embodiment, the secret information ("A") can be generated by software on Bob's device by combining a randomizing element such as a time stamp, nonce or other information, with the shared secret key on Bob's device ("$key_{Bob}$"). The software then uses a generator function "G" to generate $G^A$ (it is again noted that this notation for logarithmic generation, used in connection with Diffie-Hellman key exchange, is exemplary only, i.e., in another embodiment, Bob uses a different means, such as a different cryptographic key, to generate this piece of secret information). The term $G^A$ refers to a function where it is difficult to derive A from the $G^A$; for example, with traditional Diffie-Hellman key exchange, $G^A$ refers to an exponent of a generator (such the number "5") taken in finite space to compute a remainder. The mathematics associated with this type of encryption (and other equivalent encryption methodologies are well-known). Bob's device takes this information ($G^A$), and then further encrypts it using the secret shared key used by Bob's device to communicate with Bob's domain. Bob's device provides this encrypted "avatar" to Acme together with header information that indicates that Bob is the source of the message, that the message is to be routed to the secure network for authentication/decoding, and that the message is of a type sent to exchange a PSK; other information such as a description of the generator function, a time stamp, session ID, web form field ID, etc., can also be included as part of these headers. Since Acme is not privy to $key_{Bob}$, Acme cannot decrypt the avatar, but since Acme is privy to the header information, Acme understands that (1) a PSK is to be generated, (2) Acme is instructed forward the avatar to the secure network, and (3) Acme is to generate its own secret information "B" (e.g., using a randomizer and the shared secret key it uses for its trusted connection to the network, $key_{Acme}$) and use the same generator function "G" to generate $G^B$, and then attach $G^B$ to the avatar. This payload information (e.g., the avatar from Bob's device and $G^B$) is then encrypted using the shared secret key of Acme's device and sent to Acme's domain for forwarding into the secure network and eventual routing to Bob's domain.

Reflecting on these principles, note that Acme receives encrypted information from another entity (Bob) via a first network path and that, instead of interacting directly with Bob directly to decrypt that information via the first network path, Acme instead further encrypts this information and sends it to Bob's domain via a second network path (i.e., via the secure network). That is, Acme receives message1, generates $G^B$, adds headers as appropriate indicating that the message is being forwarded by Acme, encrypts message1 using the key that Acme shares with its domain (i.e., $key_{Acme}$) and then forwards a second message to the secure network where that second message encrypts the first message (i.e., message2=fn{message1}, $G^B$, $key_{Acme}$).

When it receives this payload, Acme's domain, in turn, partially decrypts this message back to message1 and $G^B$ (i.e., using the shared key it shares with Acme's device) and it also verifies from inspected headers that this information is to be forwarded through the secure network to Bob's connection node. As with Acme's device, the domain for that device similarly cannot decrypt message1 to directly recover $G^A$. Acme's connection node then re-encrypts message1 and $G^B$ using a shared secret key for the next hop (e.g., $key_{Acme's\_connection\_node}$) and it relays this encrypted message to the next hop (e.g., message3=fn{message1}, $key_{Acme's\_connection\_node}$, $G^B$). This process continues, using the provided header information to obtain routing guidance, until the payload arrives at Bob's domain. Software on that domain is informed that the message is for PSK generation and originates from Bob or Bob's device, and so it (a) encrypts $G^B$ using $key_{Bob}$, which it then forwards to Bob's device, and (b) it decrypts $G^A$ using $Key_{Bob}$, which it then forwards back to Acme's device. Eventually, $G^A$ is delivered to Acme's device, encrypted by the shared secret key that device uses to connect to the secure network (e.g., messagen=fn{$key_{Acme}$, $G^A$}), which Acme can decrypt.

Note that there can be potentially many hops connecting Bob and Acme. To cite one example, if Acme's device is an electronic cash register, such a cash register can receive an avatar from Bob and forward that to its domain (e.g., a server for Acme's store). The next node connection could be for example a central data center for Acme—the electronic cash register shares a secret symmetric key with the secure server for the store, and the secure server for the store shares a secret symmetric key with the data center, and so forth. The number of hops or nodes traversed can be many or few, and connection paths can be unique or redundant. Instead of an electronic cash register and point-of-sale ("POS") environment, similar examples can also be used where different nodes represent tiers within a company's Intranet, different sites or regions, a university, the Federal Government, and so forth. It is also possible to have a single node connecting Bob and Acme (e.g., a single secure service coupling both entities, such that only two hops are used). Many connection methodologies will occur to those having ordinary skill in the art As should be apparent from the foregoing, Bob possesses A and $G^B$ and can therefore compute $G^{AB}$; similarly, Acme possesses B and $G^A$ and can compute $G^{BA}$. The characteristics of these values are that $G^{BA}=G^{BA}$, but $G^{AB}$ and $G^{BA}$ cannot feasibly be reverse engineered from $G^B$ and $G^A$. Thus, the result is that $G^{BA}$ is known only to Bob and Acme. In one embodiment, $G^{BA}$ is used as a PSK. However, that depending on the encryption methodologies used for the particular embodiment, it may be desired to use $G^{BA}$ to effectuate a more complex key exchange. For example, if $G^{BA}$ is derived from Bob's and Acme's secure network keys and features a relatively low degree of entropy relative to any "randomizer" information, it might be desired to add additional encryption layers to further remove the PSK from the shared network keys; in one embodiment, therefore $G^{BA}$ can be used to encrypt the PSK and exchange the encrypted PSK between Bob and Acme. As will be discussed below, this additional step of removing PSK selection from $G^{BA}$ also facilitates logging of information exchanges, by Acme or others, for non-repudiation purposes (e.g., it renders it more unlikely that the shared secret key or the secret information selected by Bob's device or Acme's device can be discovered from logged information representing transactions). Additionally, this structure also provides for perfect-forward-secrecy, in that in the unlikely event of a network breach, as the PSK would then be independent of any potentially breached keys. Note also that there are many methodologies by which exchange of a selected PSK can be performed; for example, in one implementation, when and as Bob's device is provided with $G^B$ by its connection domain, it immediately computes $G^{BA}$, selects a PSK, and encrypts the PSK using $G^{BA}$. Bob's device then immediately transmits the encrypted PSK to Bob's domain (which then "piggy-backs" this information on information returned to Acme through the secure network); for example, as will be discussed below, decrypted $G^A$ can be transmitted to Acme via the secure network as a first packet, and the encrypted PSK can follow "on its heels" as a second packet.

The PSK can be used for a number of different purposes. For example, in one embodiment, it can be used to encrypt communications transmitted directly between Bob and Acme over an unsecured medium. In a different embodiment, however, one that will be discussed below, the PSK can be used to "doubly-avatarize" private information transmitted through the secure network such that even when the loop-based authentication flow described above is used, that this private information cannot be decoded even by nodes within the secure network.

The transmission of private information in a manner undecipherable by the secure network can be accomplished using principles already discussed and a shared PSK. The PSK is optionally exchanged using the techniques just discussed. To perform the exchange of private information, software on Bob's device takes a particular piece of private information and encrypts it using the PSK. There are many examples of private information that can be exchanged, but in one embodiment, this private information can be information used by a merchant as a secondary authentication value for a credit card or other federated credential, for example, a card check value ("CCV"), a card holder's street address, phone number or zip code, a password, or other information. Once the private information has been encrypted using the PSK, Bob's device then encrypts it a second time, this time using Bob's shared secret key, $key_{Bob}$ (which it will be recalled from the example above is known only to Bob's device and Bob's domain). Bob's device transmits this doubly-avatarized information to Acme with headers, in much the same manner as represented above (note that the headers in this case will indicate that this exchange represents private information). Note that in an alternate embodiment, software on Acme's machines (and/or the machine for Bob's domain) can be coded so as to automatically detect whether the information is singly-avatarized or doubly-avatarized (or processed with even further layers or rounds of encryption), and to process that information accordingly without the need for the property to be explicitly designated in the headers. More specifically, encryption can optionally be configured, according to the teachings herein, to generate ciphers that even upon most rigorous cryptographic inspection do not reveal how many layers of encryption were applied to the plaintext. As such, it is plausible to use multiple PSKs or other encryption parameters, e.g., as $PSK_1, PSK_2, \ldots, PSK_n$, to successively multi-layer avatarize the payload, as dictated by the level of desired security and privacy. The number of layers or rounds can be specified, if desired, by software parameter. Acme cannot decrypt this message since it does not have access to $key_{Bob}$, so it once again further encrypts this payload (message2=fn{message1}, $key_{Acme}$) to effectively encrypt it a third time. This message can be decrypted by network nodes back to the doubly-avatarized, first message transferred from Bob to Acme, and this payload is then encrypted again for forwarding to the ensuing network node. Once again, this message is routed through the secure network to Bob's domain, which uses $key_{Bob}$ to partially decrypt the message to obtain singly-avatarized information (i.e., encrypted using the PSK); since, however, Bob's secure network connection point does not possess the PSK, neither this node or any other node in the secure network (other than Acme) can fully decode the private information. Then, in much the same manner as a decoded $G^A$ was decoded and transmitted back to Acme in connection with the first use model described above, pursuant to this second use model, this information is transmitted back to Acme where it can be decoded (this time using both $key_{Acme}$ and the PSK in successive processes) and applied as desired used by Acme. For example, if used in connection with a secure credit card payment transaction, Acme can then optionally use conventional processes to approve a purchase or other transaction.

The third use model introduced above relates to the exchange of federated credentials. For example, the techniques described above can be used to exchange and validate a credit card number. Note that in one embodiment, a PSK is not used at all for this exchange. For example, if Bob wishes to share his a credit card "1234-567890-12345" with Acme's device, Bob's device encrypts this information using $key_{Bob}$ and sends this encrypted information as an avatar payload to Acme's device via an untrusted Internet or other network connection. Once again, suitable header information is included by Bob's device, in this case, indicating that the encrypted information represents a federated credential and is to be routed to Bob's domain for decoding. As before, for each hop in the chain of trust, a node in the secure network encrypts received payload information using a shared secret key specific to the hop and forwards the information on to the ensuing node; when the forwarded information reaches Bob's domain, the machine at that domain recognizes the message as corresponding to a federated credential and it decodes the credit card number using $key_{Bob}$, e.g., back to "1234-567890-12345." Bob's domain then returns this information ("1234-567890-12345"), encrypting it using its secure network shared key, e.g., messagen=fn{$key_{Bob's\_connection\_node}$, "1234-567890-12345"}. The information is then decrypted, re-encrypted and forwarded for the next hop by the various nodes of the secure network. In this case, however, one of these nodes corresponds to a trusted third party with whom Bob has registered or has an account. In one embodiment, this trusted third party can be a provider of the secure network or a node used for all communications between the domains for Bob and Acme and, correspondingly, can perform the same functions as any other node (e.g., server) in the network; in another embodiment, the trusted third party can represent a node or hop specially used, only for validation of federated credentials. Depending on implementation, the trusted third party can be a credit card company, an Internet service provider ("ISP") or search engine, or another services provider company such as Microsoft, Google, Yahoo, Lifelock or another company. As with the other nodes of the secure network, such a trusted third party decrypts information it receives to recover "1234-567890-12345," and it uses header information to identify Bob's unique ID (e.g., email address, another identifier, or a random tag/number/string), credit card type (e.g., "AMEX") and similar information.

The trusted third party then runs software that performs integrity checks on this information, running exception processes as appropriate. For example, as indicated earlier, such a trusted third party can clear the credential (e.g., optionally adding an authentication stamp or hash if Bob is truly the owner, and then forwarding the message through the secure network toward Acme) or it can inform Bob that an unrecognized transaction has been detected and solicit Bob to register a new device or take other action; other examples are also possible.

As should be apparent from the foregoing description, the various techniques introduced above can be used to provide a myriad of capabilities and benefits for secure transaction processing. These techniques can be implemented in many different manners depending on application. As but one non-limiting example, these techniques can be implemented as plugin software for a web browser; the plugin software detects various fields being solicited by a web-form or transaction device, and the plugin software then automatically and/or transparently applies all three use modes, the first one to exchange a PSK in connection with a handshake process, the second one to exchange each field which is deemed to represent private information and the third one to exchange credentials information, automatically and transparently to the user (e.g., Bob). Should, for example, Bob be called on to fill in a residential loan application online (e.g., a form calling for Bob to list various federated credentials, such as outstanding credit cards, bank accounts and social security number, as well as private information such as phone number and home address), such a browser plugin automatically detects field type and automatically applies the appropriate use model depending on the type of field at issue, all transparently to the user. Clearly many examples are possible.

With various system elements thus introduced, this description will now proceed to describe the various figures ("FIGS.") and provide additional detail concerning various specific embodiments. Generally speaking, any of the cited structures, operations, algorithms, features, use models, applications or operands ("elements") can be mixed and matched, and included or omitted in any combination or permutation as desired or as pertinent to the particular application; that is to say, while several specific detailed examples are discussed herein, which feature specific combinations of certain elements, it is generally contemplated that inclusion of any these elements are optional relative to one another and can be combined in any manner suitable or appropriate to a specific design.

Note first that several terms used herein should be introduced. First, "circuitry" can refer to analog or digital electronic elements (e.g., dedicated logic gates), either arranged as special purpose circuitry that necessarily performs a certain function when electrically motivated, or as general purpose circuitry (e.g., a processor, FPGA or other configurable circuit) that is controlled or otherwise configured by instructions (software) so as to adapt that circuitry to perform a specific function and cause that circuitry to operate as though it was special purpose circuitry. In the case of software or other instructional logic, the instructions are typically written or designed in a manner that has certain structure (architectural features) such that, when those instructions are ultimately executed, they cause the one or more general purpose circuits or hardware devices to necessarily perform certain described tasks. "Logic" can refer to software logic (i.e., instructional logic) or hardware logic (e.g., a digital chip or board design) or a combination of these things. "Non-transitory machine-readable media" means any tangible (i.e., physical) storage medium, irrespective of how data on that medium is stored, including without limitation, random access memory, hard disk memory, optical memory, a floppy disk or CD, server storage, volatile memory, memory card and/or other tangible mechanisms where instructions may subsequently be retrieved by a machine. The machine-readable media can be in standalone form (e.g., a program disk, solid state memory card, whether bootable or executable or otherwise, or in other memory) or embodied as part of a larger mechanism, for example, a laptop computer, portable or mobile device, server, data center, "blade" device, subsystem, electronics "card," storage device, network, or other set of one or more other forms of devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or common circuits, or by different processors or circuits, depending on embodiment. For example, "instructions stored on non-transitory machine-readable media" typically refers to software stored on disk or in other physical memory or storage, where the software is structured such that when it is later (ultimately) installed or executed by an operator or end user, it configures a machine (e.g., one or more processors) so that they operate in a prescribed manner. In one implementation, instructions on non-transitory machine-readable media can be executed by a single computer or processor and, in other cases as stated, can be stored and/or executed on a distributed basis, e.g., using one or more servers, web clients, or application-specific devices, whether collocated or remote from each other. Each function mentioned in the disclosure or FIGS. can be implemented as part of a combined program or as a standalone software module (i.e., an invocable or callable program or subroutine), either stored together on a single media expression (e.g., single floppy disk) or on multiple, separate storage devices, or in the form of dedicated circuitry or circuitry combined with such software. Throughout this disclosure, various processes will be described, any of which can generally be implemented as instructional logic (e.g., as instructions stored on non-transitory machine-readable media), as hardware logic, or as a combination of these things, depending on embodiment or specific design. "Module" as used herein refers to a structure dedicated to a specific function; for example, a "first module" to perform a first specific function and a "second module" to perform a second specific function, when used in the context of instructions (e.g., computer code) refers to mutually-exclusive code sets. When used in the context of mechanical or electromechanical structures (e.g., an "encryption module," it refers to a dedicated set of components which might include hardware and/or software); for example, an "encryption module" and a "network registration module" would refer to dedicated, mutually exclusive structural elements for performing these functions. In all cases, the term "module" is used to refer to a specific structure for performing a function or operation that would be understood by one of ordinary skill in the art to which the subject matter pertains as a conventional structure used in the specific art (e.g., a software module or hardware module), and not as a generic placeholder or "means" for "any structure whatsoever" (e.g., "a team of oxen") for performing a recited function. "Electronic" when used to refer to a method of communication can also include audible, optical or other communication functions, e.g., in one embodiment, electronic transmission can encompass optical transmission of information (e.g., via an imaged, 2D bar code), which is digitized by a camera or sensor array, converted to an electronic digital signal, and then exchanged electronically.

FIG. 1 is an illustrative diagram showing techniques for exchanging communications using a loop-based authentication flow. These elements are generally referenced by numeral 101 and are seen to include one or more computers 111 which run software (113) that causes the one or more computers to perform a number of tasks, and storage 119 for digital data. The storage 119 can be a mass storage, a computer attached storage, a distributed storage or some other type of mechanism for retaining data on a non-transitory basis. More specifically, a network is first built (103) using the one or more depicted computers; this network is a secure network as has been previously described, where each node in the network uses cryptographic based techniques, such that each node unambiguously "knows" that arriving communications were sent by another, known node in the network. For example, as described previously, the network is built in such a manner where (a) each node has software 115 which is installed on that node and used to manage secure communications with other nodes in the system, and (b) the installed software 115 uses a secret key to encrypt communications known by only one other node in the system. It is noted that asymmetric cryptographic processes can also or instead be used; however, a symmetric key process offers advantages in that communications can only be decrypted by a single other paired node in the system, and that the same encryption process and key can be used for return communications between the same two nodes. As indicated by function box 115, as nodes are added to the system, software is downloaded to the computer(s) for the particular node and used to configure and control that node to participate in the secure communications scheme disclosed herein. As the network is built, end clients are also added to the network as additional nodes, per numeral 105; for example, returning to the example introduced earlier, if "Bob's smart phone" is not coupled to the network, Bob can be invited to join the network and enroll a specific hardware device. Each end user can have more than one enrolled device and each device can be coupled to the secure network through a common communications node using a respective (shared) cryptographic key. As denoted by numeral 117, as end clients are added, those clients also typically download client transaction module software, which configures the clients' machines to implement secure communications as described herein; for example, this client transaction module can be a standalone software program, an app. intended for use on a pad device, smart phone, television, Blu-ray player, or other type of digital device. In yet other embodiments, such a module can comprise software as well as hardware, for example, using a secure hardware partition on digital device (e.g., smart phone) or a protected memory having a built-in device cryptographic key. Once added to the network, these end clients can communicate with other participants in the secure network, with the clients transmitting avatars, and the intended participant routing communications in a loop through the secure network to perform decoding, authentication and exchange of a private session key ("PSK") and/or other information, as introduced above. The secure network routes communications through the network (per numeral 107) and also provides loop-based flow for decoding avatars sent by the originating end-user. As noted by numeral 109, the secure network also provides for verification of federated credentials in the manner previously discussed. Note that these described functions can be implemented on one machine, on respective machines and/or networks, on a distributed basis over multiple networks and/or machines, as depicted the representation of multiple computers 111. To aid in the verification of the federated credentials, the network turns to a database 119 (i.e., repository of data stored in non-transitory storage media) representing the various federated credentials that pass through the system and authentication information (relating to participants in the secure network) that can be used to detect whether the federated credentials are being used in a manner that does not involve participants of the secure network, or otherwise potentially represents misuse. In an optional model where a trusted third party both acts as a central hub for the secure network (e.g., builds trusted communications relationships, adds nodes and clients and validates federated credentials), the database 119 can also be used to update and distribute a network map, receive revocations data for keys and credentials, log or track communications for record keeping (nonrepudiation) purposes, or for other advantage.

Figure 2:
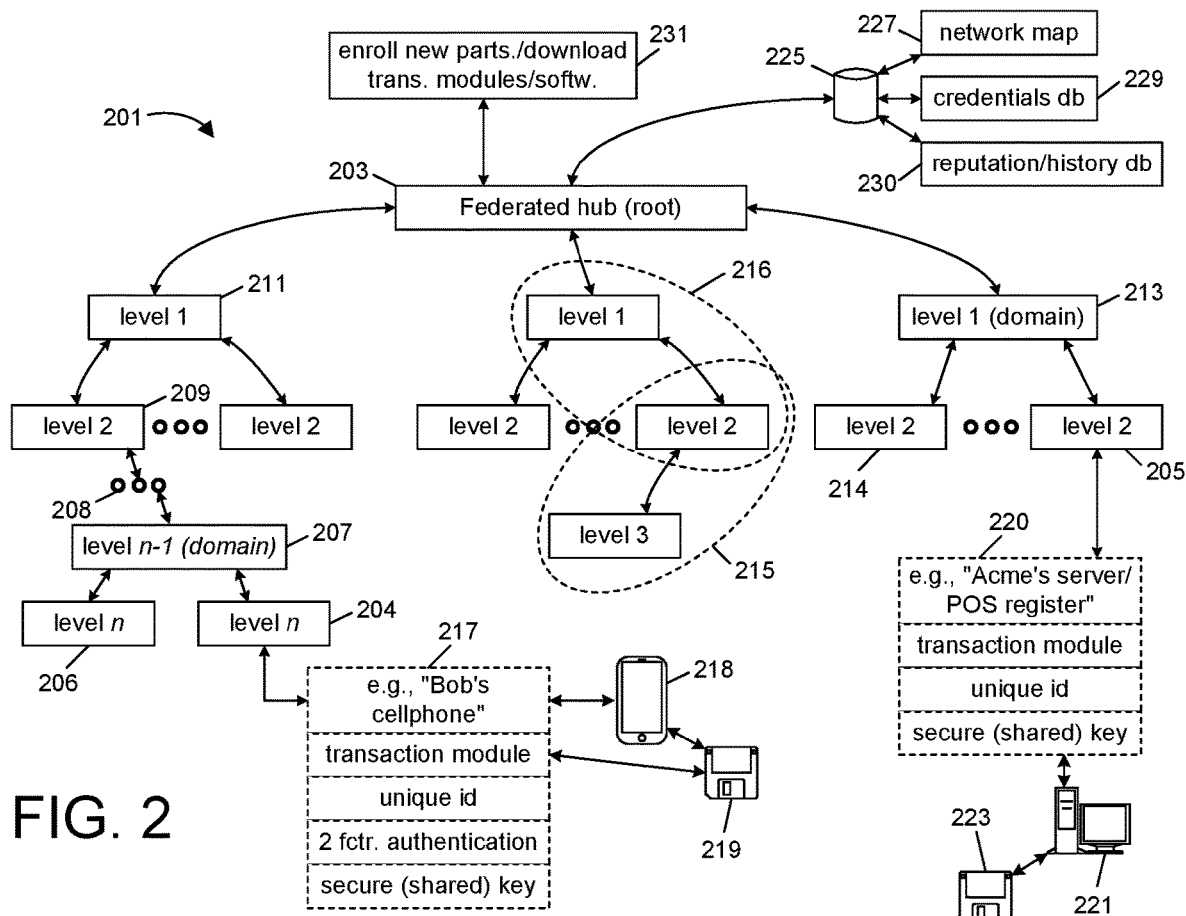
FIG. 2 is an illustrative diagram showing layout of a trusted, secure network, and is used in part to describe how such a network is built to provide a chain of trust.

FIG. 2 shows an illustrative diagram of one embodiment 201 of a secure network built according to the principles described herein; the particular network depicted is predicated on the use of a central hub or root 203 for verification of federated credentials, and thus is seen to have a leaf-node structure such as is represented by exemplary branches 204/207/208/209/211/203 and 205/213/203, but other embodiments have (a) a flat structure, e.g., with only a single node connecting all participants, (b) a redundant structure (e.g., with nodes connecting a pair of participants in the alternative, thus providing alternate routes available for use predicated on node bandwidth, down-time or other factors), (c) a dynamic structure with potentially ad hoc connections between nodes, and/or (d) a distributed architecture with no central root or hub and a "web" of potentially complex connections. It is within the abilities of one of ordinary skill in the art to design a system using a connection fabric different than the one seen in FIG. 2; the depicted embodiment, 201, is drawn in a manner that will be used to describe pairwise connections between network nodes, each predicated on a shared secret key, and the fact that some nodes may or may not be used depending on how communications are routed.

More specifically, the federated root 203 in this embodiment is to perform not only verification for federated credentials (229), using a stored database 225, but also to manage state of the secure network (and build and updated network map 227), track reputation of certain sites/entities (230) and enroll new participants/network nodes and provide software to these sites as appropriate (231). Note that as the network is built, there can in this embodiment be many levels of separation from the hub 203 to end-user devices. For example, an end-user device of a particular user is represented at the left-side of the FIG. by numeral 204, and is listed at "level n." There can be many different configurations and associated motivations for having multiple (i.e., "n") levels; for example, the user could be an employee of a large, multinational company where the user's domain represents a company site (e.g., "US-Palo Alto, Calif.") and represents software installed on a local company security network for managing various devices of the company's employee base. Many other examples are possible, including examples involving government, autonomous machines, private individuals, and so forth). In this case, the company site is represented by level n−1 (207), which is indicated to be the end-user's domain. In one embodiment, it is this domain, the closest node to the end-user, which will be used to decode avatars and return them through the network in accordance with the principles discussed earlier. As noted earlier, device 204 will have a shared symmetric key that allows it to establish private communications with its node 207 for connecting to the network; another end-user device, represented by numeral 206, will have its own shared symmetric key that allows it also to establish private communications with node 207, and node 207 manages these key sets (along with other functions described herein). [Note that this second end-user device could be another enrolled device belonging to the same user or potentially to another individual or entity, and that there may be many more than the depicted two end-user devices connected to this node 207.] Node 207 will connect with another domain above it (represented by ellipses 208) using a shared key specific to that relationship, and so on, up through node 209, node 211 and ultimately the hub 203; as was described earlier, generally speaking communications from end-user device 203 to node 207 are encrypted using the shared secret key of the end-user device 204, and the same is true for every other depicted hop, e.g., from level n−1 to level n−2, . . . level 3 to level 2, level 2 to level 1, and from level 1 to the hub 203, and so on. This is to say, each pairing of adjacent nodes is managed to have its own trusted relationships, as is represented by large ellipses 215 and 216, which pairwise encompass nodes, as seen in a middle network branch in the FIG.; only two such relationships are circled but it should be understood that in this embodiment, every node direct node connection pairing has a similar trusted relationship and shared symmetric key. As noted earlier, the depicted number of tiers (levels) in this FIG. (i.e., "n") and the use of connection "branches" are used for example only, and there could be any number of nodes connected end-users/participants (e.g., connecting end-user device 204 with machine 205, seen at the right hand side of the FIG.), arranged as a "flattened" network, a complex "web," or in another manner. In a typical communications example, it might be that the end-user device 204 is a smart phone of an individual (e.g., "Bob") or another type of digital device, as mentioned. As depicted by numeral 217, Bob downloads transaction module software to each device bob wishes to enroll, e.g., from his connection node 207, from the hub 203, or from another source; this software, the can either be relied upon to identify a unique ID for Bob (e.g., Bob's email, or something else) or, preferably, this can be done as part of Bob's initial registration with the system (e.g., via a graphical user interface page presented by an installed app. on Bob's device, or a secure registration web page provided by the federated hub, Bob's domain (e.g., his company) or a provider of the secure network, for display on Bob's device). As also referenced by numeral 217, this software when downloaded and installed on Bob's device requires 2-factor or better authentication from Bob when he wishes to invoke the software (e.g., each time his device seeks to activate the transaction module to effect secure communications) to insulate use of Bob's secret shared key against device theft or compromise. One example of exercising high-security authentication upon every new launch of an application Bob, is to utilize hardware credentials carried by a "FIDO Alliance" certified security token device, with a predefined cycle/period of re-authentication. A software-only multi-factor launch authentication can also be effective, such as using a personal identification number ("PIN") combined with a unique random-but-retrievable signature, such as a binary-file or a QR code (whether static or dynamically derived from another PIN), or by other means. The transaction module software (or another module, e.g., a key generation software module) establishes a unique cryptographic key on the newly-enrolled device; again, in one embodiment, this is a shared key that will be used to connect Bob securely to node 207. This shared key can be a relatively long, complex key (e.g., 2 k bits or longer in length) and is installed on Bob's device using a conventional key exchange/generation protocol (e.g., such as a Diffie-Hellman exchange, optionally predicated on use of a manufacturer-provided unique device hardware key). As noted by numerals 218 and 219, Bob's device can be any type of digital device (such as the depicted smart phone), running suitable application software (depicted using a floppy disk icon 219). This software is stored on non-transitory media, such as Bob's phone, a floppy disk, server storage, or in some other manner, and can be preinstalled or selectively downloaded to Bob's device 218 such that, when executed, it causes Bob's device to perform as a special purpose machine.

In one embodiment, in order to safeguard against the possibility of compromise of or misuse by any node in the trusted network, software for each of the source (e.g., Bob) and destination (e.g., Acme) can employ two secret-keys that are privately held and kept secret from the rest of the world, a) the private-key of a public-private key-pair, b) a private symmetrical-source key from which the shared symmetrical key is derived with a KDF (Key-Derivation-Function). These private keys can be used by the source/destination to refute any logged transactions in a future forensic review in case of a dispute. In other words, in the unlikely event of a breach (e.g., perpetrated by a Trojan-staff or a data-breach in the trusted network), the source/destination can present in privacy the double private keys in front of a review panel, to show that communications at-issue could not possibly have originated from that particular party. One advantage of such a process is that owning the 'private-key' of a public-private key-pair provides a generally accepted mechanism for non-repudiation.

Per the examples introduced earlier, it is assumed that Bob wishes to securely communicate via untrusted connection with another device 205 that is also part of the network or is added to the network. This device 205 is seen at the right side of the FIG. and is depicted to be a level 2 device, implying that it connects up through a level 1 (domain) 213 and then to the hub 203. Each of these node pairings is also configured as a secure trusted connection, meaning that the hub communicates with node 213 using a shared secret key, and that node 213 communicates with device 205 using a (different) shared secret key. Again, while the depicted configuration could represent many different implementations, an example will be used where device 205 is a transaction server or point of sale device of "Acme," and where node 213 is perhaps a store server connected to many such devices (e.g., as represented by numeral 214). Each device (e.g., each transaction server or point of sale device, 205/214) will download a transaction module; this transaction module configures the device to respond to communications from Bob's device 204 by relaying avatars and other communications through the secure network, as has previously been described. Bob's device 204 could be attempting communication with device 205 through any untrusted connection, for example, an optical (e.g., 2-D scanned bar code from a display of Bob's device), via an Internet or Bluetooth connection, or in some other manner. Alternatively, it is also entirely plausible for Bob to establish first contact with Acme through the secure network itself. As represented by numerals 220, 221 and 223, the software downloaded to devices 205/214, will establish a unique ID for those devices, a shared secret key, and appropriate communication protocols for recognizing different communication types (e.g., PSK exchange avatar, federated credentials, private information) and for appropriately encrypting/decrypting and otherwise handling information routed through the secure network. Once again, the software can be in the form of instructions stored on non-transitory machine-readable media, where those instructions, when executed, cause one or more processors of the device to operate in the manner of a special purpose machine.

Reflecting on the structures and relationships depicted by FIG. 2, a secure network is built where every node in the network directly connects to one or more other nodes via a secure, trusted connection. Security protocols (and cryptographic processes) are established which permit each node to, with confidence, rely on these connections such that only known, registered parties that are part of the network can communicate with each other using the described infrastructure. This structure provides a backbone that will be used to route avatar-based communications (i.e., from Bob to Acme via untrusted connection) through an alternate path, in a loop, back to a point where a shared key permits the network to decode transmitted avatars and/or put Acme in a position where it can decode these avatars. The use of a shared, symmetric key architecture helps foster an environment that reduces the likelihood of fraud, i.e., Bob's device is not relied on to decode his own avatars but, rather, it is predicated on an established connection with the secure network, relying on the secure network to decode communications. The use of reputation information (230) permits a federated hub to regulate parties permitted to join the network, to deny participation from known tortfeasors or entities of dubious reputation, and to cancel/deny relationships predicated on misuse or inappropriate conduct.

Figure 3:
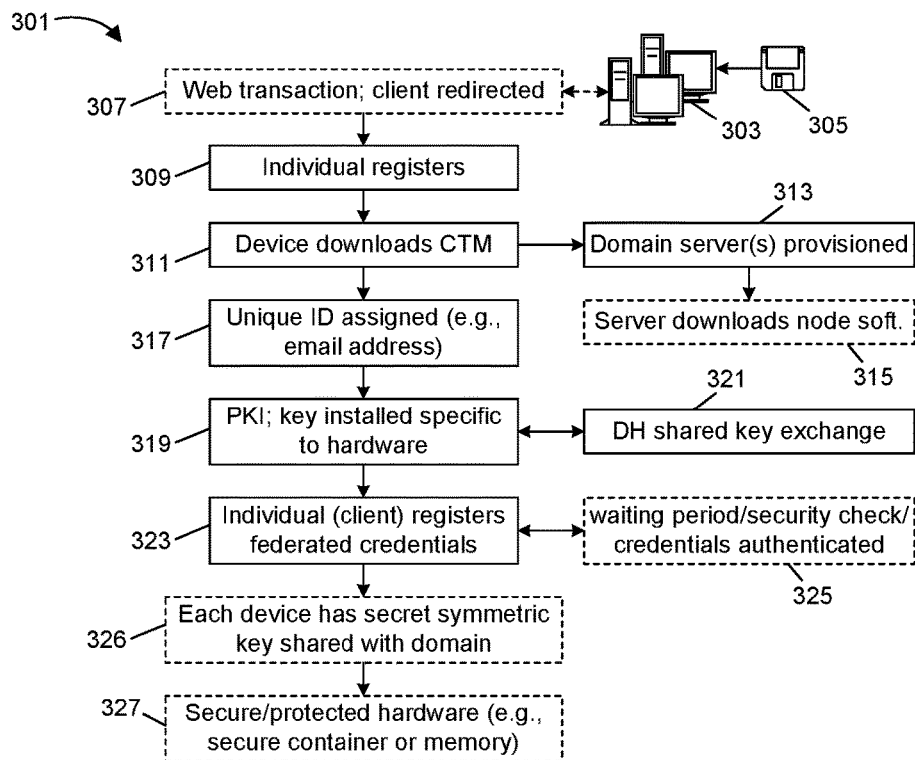
FIG. 3 is a flow diagram showing provisioning of a client to interact with the trusted network of FIG. 2, and to generate and present avatars that will be used for information exchange.

FIG. 3 provides additional detail on how a new device can be added to the secure network, using a series of method steps which are generally referenced by numeral 301. Once again, these method steps can be embodied in the form of one or more machines 303 comprising circuitry that performs certain functions; this circuitry can include one or more processors or other logic circuits that optionally rely on software, 305, to configure such processors or circuitry to behave as special purpose machines.

As indicated by an optional process block 307, a new client can be directed as part of a web transaction to a site for the secure network. The client machine can be directed to this by scanning a 2D bar code representing a URL or can otherwise be directed to the site via receipt of an email invitation or web page redirection. Per numeral 309, the new client (e.g., end-user) then downloads registers for use of the network providing information such as name, email address and other data. The client then downloads (311) client transaction module software which, as mentioned, will configure the client device to perform the cryptographic, avatar generation and other communication functions referenced herein, e.g., by installing specific software modules for each of these purposes; in one embodiment, this software can be embodied as an app. suitable for download onto a smart phone, pad device, computer, digital television, disk player or other device. This software optionally, as part of a setup process, calls upon the new client to register his or her unique ID, 317 (this can also optionally be performed by a separate process, before the new client is permitted to download the client transaction module software). Per numerals 313 and 315, the network can as necessary establish and configure various domain servers as appropriate, e.g., to increase bandwidth, establish secure servers in closer proximity to the new client, invite an organization or employer associated with the new client to join the secure network, and so forth; as appropriate, any newly added server can be invited to download node software that will perform various server-level functions discussed herein, for example, retrieving or receiving updated maps of the secure network, locally establishing a key data base and database of registration information for supported clients, performing header inspection and associated routing functions, and so forth. Each newly enrolled device, per numeral 317, is associated with a unique ID, either for the device or the user; as implied, in one embodiment, such an ID can be shared across devices—for example, "Bob" might choose to enroll his smart phone as well as his laptop device as respective registered devices. Each of these might be associated with Bob's unique ID (e.g., "bob@example.com"), such that transactions can be routed in a manner where the shared key specific to each device can be used to decode communications at the Bob's domain (in such an implementation, software for Bob's domain might cause that node in sequence attempt to use each shared key associated with "bob@example.com" to detect if there is a match). Other configurations are also possible; for example, software logic can be designed such that communications associated with "bob@example.com" can be directed to multiple nodes, e.g., Bob can have respective devices that connect to the secure network through different nodes, or respective sets of nodes. Note that as depicted by numeral 319, processes are used to establish cryptographic functions on each device, e.g., using PKI and/or a hardware key specific to each device to install the shared secret key. Per numeral 321, a key exchange protocol such as Diffie-Hellman or an equivalent can be used as part of this process. Once the client device has installed the base software functionality, the client (if this has not already been done, e.g., in association with another device of the same user) can be requested to enroll (323) any additional federated credentials in a manner linked to the user's account, for example, credit card numbers, social security numbers, account numbers, and so forth, in a manner associated with the user's account. In one embodiment, these can be stored at the hub's credentials database in an encrypted manner, e.g., such that a hash can be used to detect correspondence between federated credentials (transmitted through the secure network as part of the authentication loop), and such that the hub does not store credentials in a manner that can be easily hacked or otherwise discovered. Per numeral 325, an optional waiting period, security check, authentication or other function can be used to verify credentials before they are available for use with the new client (e.g., with "Bob") as part of the loop based authentication flow. For example, the federated hub can perform a credit check, process a test transaction, require secondary authentication factors, or take other actions to verify that the each enrolled credential truly belongs to "Bob." Once enrolled, Bob's unique ID (e.g., "bob@example.com") and potentially other information will be used to verify that someone claiming to be Bob is truly the owner of the enrolled credentials; for example, as introduced previously, during loop-based authentication flow, the hub or another service can inspect headers and verify that a credit card number matching "Bob's" credit card is cited exclusively by a communication involving Bob's unique ID (e.g., "bob@example.com"). If this correspondence is not confirmed, the communication can be dropped, rejected, reported, or other action can be taken. For example, if a communication from "paul@12345.au" is submitting Bob's credit card number: a fraud message can be sent to Bob, Acme and or others, and the transaction can be rejected (e.g., the prohibits decoding of the fraudulently claimed federated credential, drops the message, or sends a directive to Acme, such that Acme will never receive or process a wrongfully associated federated credential); Acme's web page or other transaction processing equipment can be caused to reject the transaction; the hub can black list the nefarious source (e.g., the hub or a third party can immediately revoke all registrations of "paul@12345au" within the trusted network and prohibit registration of that address, can disallow future registration of any email-addresses that are associated with or similar to "paul@12345au" or can ban use in the trusted network of credentials such as SSN, CCNs, state-DL #, bank accounts, associated with the nefarious source); or other actions can be taken. As noted by numerals 326 and 327, each device, once enrolled, has a secret symmetric (shared) key with one or more connection nodes to the secure network, optionally, stored or otherwise processed using secure, protected hardware of the device such as a secure container, secure memory, secure partition, or other resource; this resource preferably locks the shared key (once installed) against external inspection, e.g., once installed, the key may be used to process data and encrypt that data (e.g., to generate a PSK) but the key may not be read or discovered outside of such a container. Preferably also, the transaction module or other installed software module possesses code to wipe and install a new shared key, for example, on a periodic basis, or responsive to remote command (e.g., from the hub), thus providing one possible mechanism for revoking or resetting a device's network connection in the event of device or key compromise.

Figure 4:
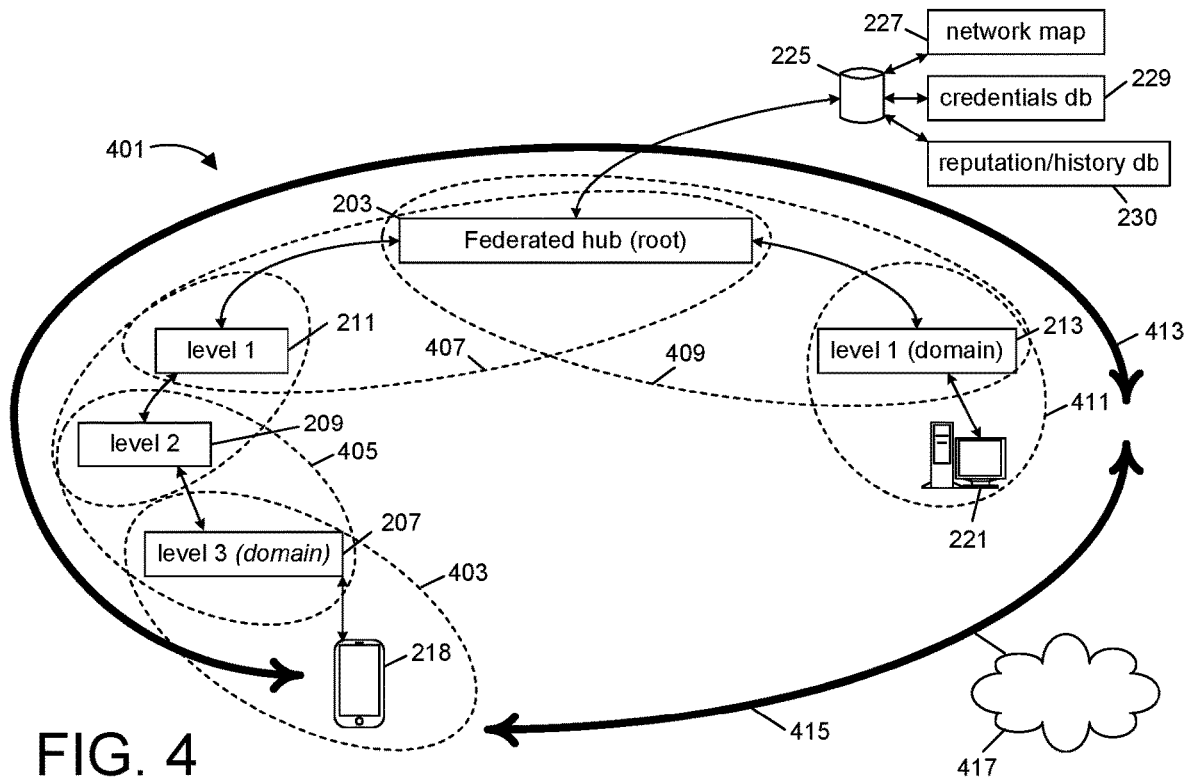
FIG. 4 is an illustrative diagram used to explain loop-based authentication flow.

FIG. 4 is an illustrative diagram used to discuss loop-based communications flow (generally referenced using numeral 401). A device (e.g., Bob's smart phone) 218 is to communicate with a machine 221 belonging to Acme, i.e., a destination device for Bob's transaction. This communication is to occur via an untrusted connection 415 (optionally occurring via the cloud or the Internet 417). Pursuant to various processes described above, software on Bob's smart phone generates one or more avatars which are directly communicated to device 221 via untrusted path 415. Software on Acme's machine 221, recognizing that these communications are to be routed through the secure network, further encrypts these avatars using the key shared between machine 221 and Acme's domain (213), and forwards these avatars to that domain 213. That domain 213 in turn routes the avatars to the hub (203) and from there on to level 1, level 2 and level 3 nodes 221, 209 and 207, traversing a leaf structure to Bob's domain 207; the level 3 node, in this example, is the node that uses a trusted relationship to connect Bob's smart phone 218 to the secure network. In other words, Acme's machine 221 receives encrypted information (avatars) from Bob via path 415 and instead of responding via path 415, it instead routes these avatars through loop path 413 for decoding. The avatars are further encrypted using each pair-wise secure trusted connection between nodes, i.e., represented by trusted relationships 411, 409, 407, and 405. Each node along this forwarded path cannot decrypt the avatars, but can merely use the shared keys used to connect that node to various points of the secure network to partially decode and then re-encode received communications. Node 213 recognizes from header information that received avatars are to be sent to the hub 203 for routing (or otherwise are to be sent to Bob's domain), and the avatars are routed to that node 207 where they are decoded. Node 207 responsively interacts as necessary with Bob's smart phone 218 (e.g., to establish a PSK) and otherwise returns decrypted information from the avatars back via path 413 to Acme's machine 221; for each relay of this decrypted information, the information is encrypted using a shared secret key pertinent to the trusted relationship, is decrypted at the receiving point, and then is re-encrypted using the shared secret key for the next hop, and so forth. That is to say, the decrypted information from the avatars is securely transmitted back to Acme's machine 221 via trusted connections 405, 407, 409 and 411. Because this information is decrypted at each node prior to re-encoding, the hub can see federated credentials and can verify that Bob is the true owner of these credentials, for example, by reference to its database 225 (e.g., and using the stored network map (227), credentials database (229) and reputation/history database (230), as appropriate). Note that for private information, such can be "doubly-avatarized" as introduced earlier, e.g., this information can be encrypted by an avatar within an avatar, such that even with this node communication configuration, private information can be rendered unintelligible to the hub and to every relay point within the secure network; because (as discussed earlier) this information was encrypted using a PSK (previously exchanged between Bob and Acme), the authentication loop is used to decode the second level avatar (i.e., encrypted using the shared secret key of Bob's smart phone 218), and once returned to Acme's machine, that machine can decode the first level avatar returned by the authentication loop using the previously exchanged PSK, to thereby fully decode the secret information.

Figure 5A:
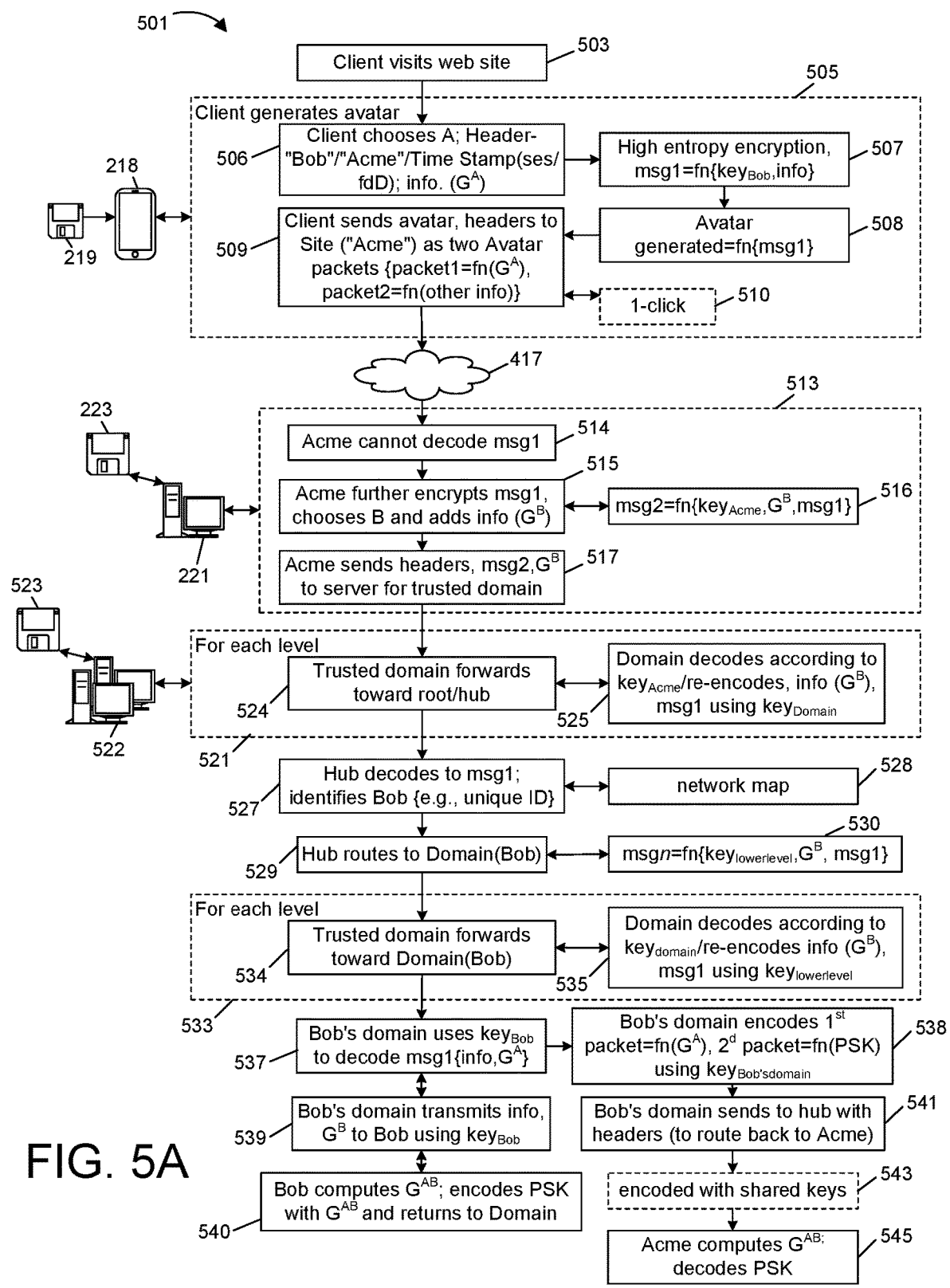
FIG. 5A is a flow diagram used to explain generation of a private session key ("PSK") and secure exchange; generally speaking, the PSK is exchanged using the loop-based authentication flow of FIG. 4. The two parties to the exchange are generally referred to as "Bob" and "Acme."
Figure 5B:
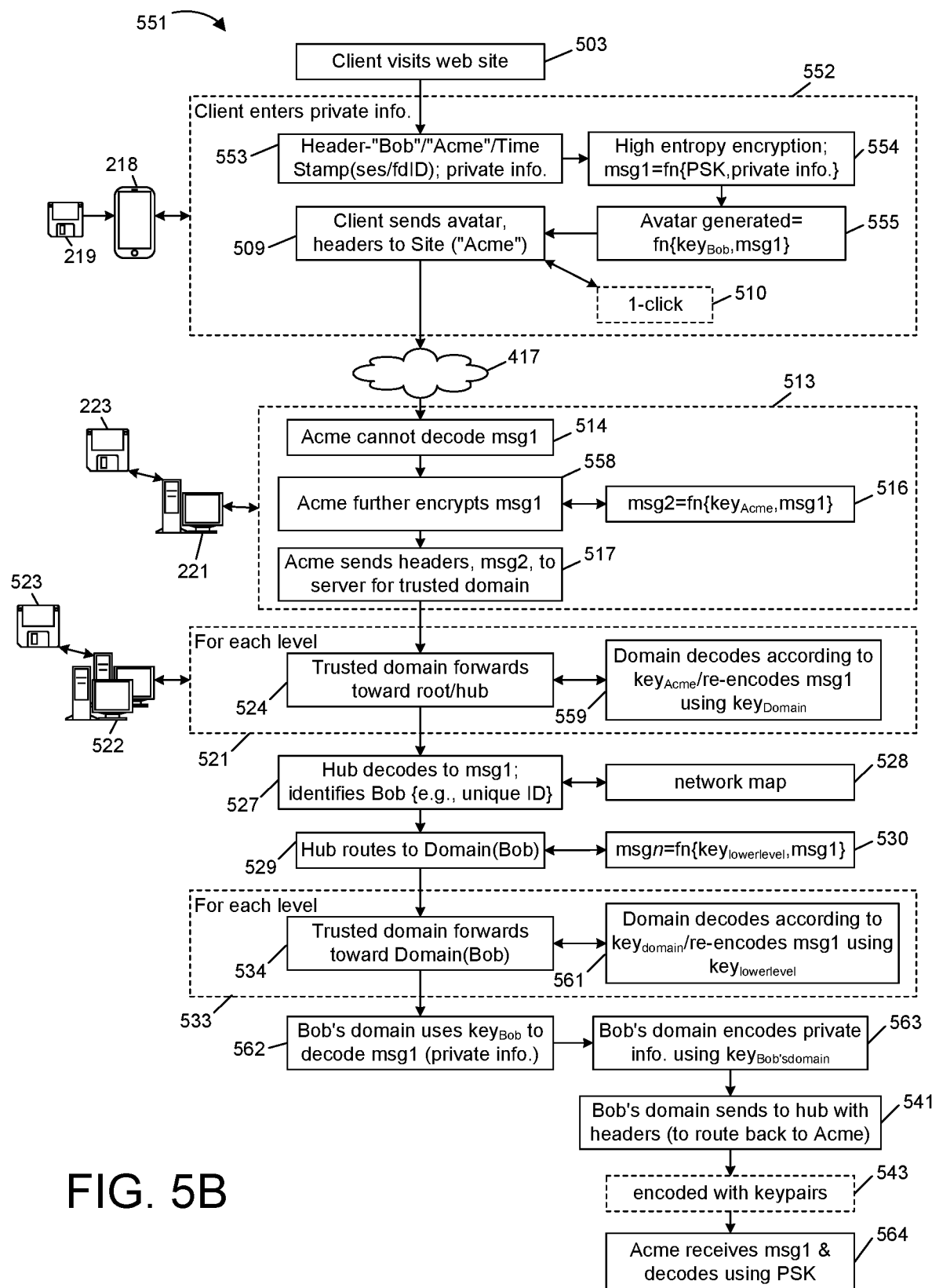
FIG. 5B is a flow diagram used to explain secure exchange of private information using the loop-based authentication flow of FIG. 4 and using the PSK from FIG. 5A, but in a manner such that private information is visible to only Bob and Acme.
Figure 5C:
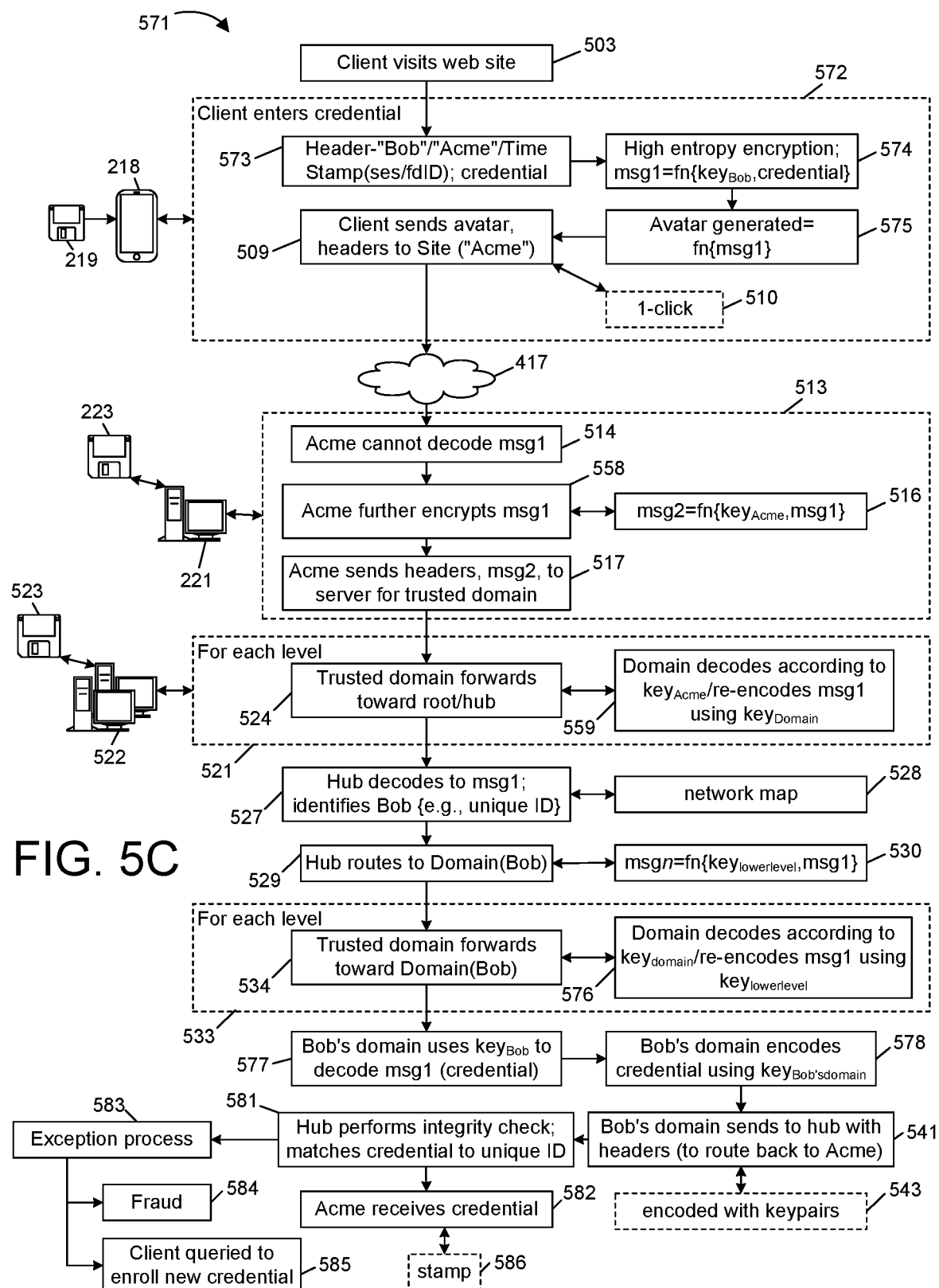
FIG. 5C is a flow diagram used to explain exchange of a federated credential by Bob and Acme using the loop-based authentication flow of FIG. 4. In the specific embodiment of FIG. 5C, the federated credential is verified as belonging to Bob by a trusted third party (referred to as a "hub" in the embodiment of FIG. 5C).

The various exchange protocols and use models already introduced will now be discussed in greater detail with reference to FIGS. 5A-5C. FIG. 5A shows processes 501 generally associated with PSK generation; FIG. 5B shows processes 551 generally associated with exchange of private information (i.e., using an already-exchanged PSK); and FIG. 5C shows processes associated with exchange of federated credentials. It is assumed for purposes of FIGS. 5A-5C that all parties to a communication, for example a client (e.g., an end-user, "Bob") and a destination (e.g., a point-of-sale terminal or transaction server of "Acme") are members of a secure network, set up as introduced above.

As denoted by numeral 503 in FIG. 5A, when a client ("Bob") first visits an electronic site, either the originating device (e.g., Bob's digital device used to access the site) or the destination device (e.g., Acme's point-of-sale terminal or server) indicates that information to be communicated from Bob to Acme (or vice-versa) is to be communicated using loop-based techniques as discussed herein. Such an indication can then trigger, for example, a browser plugin that then invokes functions as described with respect to FIGS. 5A-5C, either transparently to Bob/Acme, or on a user-accepted or user-initiated basis. Assuming that the avatar/loop-based system is to be used to securely communicate data, in one embodiment, a handshake is automatically performed to establish a back end "loop connection" through the secure network between the destination device and the secure network access point in the originating device's domain as has already been discussed; as part of such a handshake, software on the originating device, the destination device, or both, can be configured to automatically and transparently establish a private session key ("PSK") in anticipation that private data might be exchanged between Bob and Acme. FIG. 5A shows a process that can be used for such a handshake; note that such a process is not required for all embodiments, e.g., it is possible to simply rely on techniques for exchanging (and verifying) federated credentials in a manner not requiring a PSK (see the discussion of FIG. 5C, below). Also, note that a handshake process can be beneficial for verifying that inbound information (e.g., a secret value chosen by Acme, "$G^B$," indeed is responsive to Bob's interaction with Acme—for example, as noted below, in one embodiment, Bob can be prompted by his device to enter a security challenge, which can be forwarded with his avatar and used by Bob's device to verify that incoming information from Acme indeed is responsive to Bob's interaction with Acme).

The originating device first generates an avatar (505) which it then will share with the destination device according to the principles discussed herein. First, software (219) operating on Bob's device (218) generates some private information "A" that it will use to generate a key shared only by the originating and destination devices; "A" for example can be a function of the secret shared key stored on the originating device (and shared with its connection point to the secure network) and some randomizing information, for example, a challenge selected by Bob, Bob's identity, a destination URL or IP address, a session ID, field ID, a time stamp, or similar information (506). Much of this information will also be generated and used in header information to be send in connection with a transmitted avatar, for example, in a manner that can be used to route the avatar through the secure network in an appropriate manner and then by the destination device to appropriately match returned information with its proper session and associated field. In one embodiment, this randomizing information is selected in a manner where it will always be different (e.g., an instantaneous time stamp is chosen) and in other embodiments, this does not have to be the case. A key generation module uses this information to produce a value having a high degree of entropy based on these various values; by high entropy, it is meant that even a slight change in any of the input values will lead to a widely varying output, i.e., it is computationally infeasible to reverse engineer the secret shared key stored on Bob's device (218) even given knowledge of the output information and the randomizing information. In one embodiment, the information "A" can be generated by using Bob's shared key as a primary value, by prepending a seed value or an initial value, and by then performing a CRC-division of the aggregated value, and encrypting a remainder. See generally U.S. patent application Ser. No. 14/831,070, referred to previously. In another embodiment, these or other techniques are used to generate a unique value, which is then applied to a generator function to compute $G^A$, to generate the information that will be avatarized and set to Acme. Note once again that, herein, references to logarithmic key exchange protocols (e.g., A, B, $G^A$, $G^B$, $G^{AB}$, $G^{BA}$) should be understood as applying equally to any other key exchange protocol, e.g., based on elliptic curve cryptography or other methodologies. Once $G^A$ has been identified, it is then encrypted using the shared secret key on the originating device to generate the avatar (508). Since this avatar has been encrypted using the shared secret key stored on the originating device, and since that key is known only to the originating device and its domain, only these two entities can decode the avatar. The originating device then sends the avatar with appropriate headers to the destination device as two avatar packets (509); the first avatar packet is a function of the encrypted secret piece of information ($G^A$) and the second avatar packet is a function of an encrypted security challenge entered by Bob or chosen transparently by Bob's device. The use of these two packets will be explained below. As denoted by numeral 510, in one embodiment, all of this processing is optionally effectuated using a single mouse click or a single tap or swipe on a smartphone touch-screen. For example, the transaction module (represented by numeral 219) on Bob's smart phone detects that Acme's site is one that accepts avatars, it prompts Bob to enter a secure challenge or otherwise approve use of the avatar function, and upon acceptance, it automatically generates the avatar (i.e., the avatar packet(s)) using the functions represented by box 505). Once generated, this information is sent to the destination device via an untrusted connection, once again represented as the cloud or Internet 417.

Functions performed by the destination device in receiving and rerouting received packets are represented generally by numeral 513. The destination device is represented in FIG. 5A as once again being a machine (e.g., point-of-sale device or server) 221, running under auspices of suitable software 223. Once again, this software is depicted as instructions stored on non-transitory machine readable media (represent by a floppy disk icon). As conveyed by block 514, Acme's device cannot directly decode the avatar payload from Bob, as it does not have access to the secret shared key stored on Bob's device. By inspecting the headers arriving from the originating device together with the avatar payload, the destination device discovers that the received packet is part of an initial handshake and PSK exchange, and it routes the avatar payload through the avatar network, adding information $G^B$ chosen by the destination device. As was the case with information $G^A$, this information can represent some secret piece of information selected by the destination device applied to the same generator function (G) that was used by the originating device. In one embodiment, information on the generator function (G) is sent by the originating device to the destination device 221 as part of the enclosed headers. Per numeral 515, the destination device further encrypts the received avatar payload using its shared secret key (516), and it also encrypts any added information (such as $G^B$) using this same shared secret key. The avatar representing $G^A$ is thus doubly-encrypted at this point, while $G^B$ is singly encrypted using the shared secret key for the destination device. Together with the appropriate headers, the destination device then sends this information (517) to its connection to the secure network (e.g., to its domain).

This information is then routed back to the domain for the originating device for processing, as has been previously discussed. For every relay of this information, a node or level in the secure network (a) decodes the received information according to the shared secret key for the prior hop, and (b) re-encodes that information using the shared secret key for communications with the next hop, per numeral 525. This information is then forwarded to the next level (e.g., toward the hub in a system having a hub, for routing to Bob's domain), per numeral 524. This processing is repeated for each trusted network connection (e.g., for each of dashed-line ellipses 403-411 from FIG. 4), each represented by processing block 521. Each node or level can be embodied as one or more machines (e.g., processors), 522, running suitable software 523.

In the depicted embodiment, header information for the avatar is used to route information from Acme through the secure network to the hub, and the hub, then routes the forwarded information through the network nodes toward Bob's domain. This structure permits the hub to manage communications flowing through the secure network, potentially at the expense of availability; for example, if a particular node is offline, communications through the secure network can be impacted absent presence of an alternate path. For this reason, some designers might wish to permit a structure where network nodes can directly address each other (e.g., a web architecture) where, for example (see FIG. 4), Acme's domain (213) upon receiving forwarded avatars from the destination machine (221) can directly transmit those avatars to the connection point (207) to the secure network for the originating machine (218) using a shared symmetric key unique to that connection path, or otherwise using a reduced number of hops. Such a design is readily accomplished via the distribution of updated network maps to nodes of the network, and by the use of node software which permits any two nodes or domains in the secure network to directly establish trusted connections between themselves. However, it is noted that the use of a central hub is generally more consistent with the business model of an internet services provider (e.g., Google, Microsoft and others), which may wish to provide a suite of services to their clients consistent with their business model. Whichever architecture is best will be an implementation choice of the particular designer; for the present, it suffices to note that the use of a central hub provides one example amenable to federated credential validation by the hub, consistent with the business model just referenced.

Returning to FIG. 5A, as with the other nodes, the hub is able to decode the forwarded information it receives (e.g., $G^B$), but it does not possess the key shared by the originating device 218 with its domain, and therefore it also cannot decode the avatar payload ("msg1"). It identifies the pertinent routing from the inbound headers (527) and uses the network map (528) to route the forwarded message to the domain for the originating device (529); once again, it encrypts forwarded information using a shared secret key used for a secure trusted connection and a network node one hop closer to Bob's device (218). In FIG. 5A, this is represented by the notation msgn=fn{key$_{lowerlevel}$, $G^B$, msg1}, box 530. Once again, the same process is performed (per numerals 533-535) where each recipient node partially decodes received information, re-encodes this information using the secret key shared with the next level, and forwards the information one step closer to Bob for each node in the system. For example, with reference to FIG. 2, the avatarized $G^A$ and $G^B$ are forwarded through node 211 to node 209, and so forth, until the information arrives at the domain for the originating device (207 in FIG. 2). As this node also possesses the shared secret key used by the originating device, it decrypts the avatarized $G^A$ (step 537) to recover the information originally encoded by the originating device; note that two decryptions are performed to achieve this end, i.e., Bob's domain uses the secret key it shares with the node above it to decrypt the message it receives (i.e., to recover $G^B$ and the avatarized $G^A$ originally sent by Bob's device), and it then uses the secret key it shares with Bob's device to decrypt the avatar. Per numeral 538, this node then re-encodes $G^A$ and transmits it back to Acme (541), once again, iteratively encoded with shared secret keys respective to each hop along this path. Per numeral 539, this node also encodes $G^B$ (and any challenge information, if used in the implementation) and forwards this information to the originating device (Bob's smart phone) using the key it shares with Bob's device (key$_{Bob}$). Bob's device receives this information, verifies its authenticity (e.g., dependent on match of the received/forwarded challenge information with the originally shared challenge information), computes $G^{AB}$ (using the received $G^B$ and original unshared information A), selects a private session key (PSK) according to a defined protocol and, then, it doubly encodes this information (a) using $G^{AB}$ and (b) using key$_{Bob}$. Bob's device then transmits this doubly-encrypted information back to its domain (540).

Note that it was earlier referenced that the originating device, in communicating with Acme's site, can generate two avatar packets. Per numeral 538, both of these are received by Bob's domain and each of these prompt a return through the secure network to the destination device (i.e., to Acme). The first packet is processed and results in a return packet to Acme that carries de-avatarized $G^A$, while the second packet is used (i.e., based on the header information it encloses) to return the doubly-encrypted PSK. As denoted by numeral 545, the originating device (Acme) receives the first packet and recovers $G^A$ using its shared key with its connection point to the secure network; since this node also possesses unshared information B, it can compute $G^{AB}$, which is identical to the information computed by Bob's device; when the second packet is received, its enclosed information is doubly-decrypted, first using the key shared used by the destination device for its trusted connection to the secure network, and then using $G^{AB}$ to recover the private session key (PSK). The PSK is then known only to the originating and destination devices (i.e., Bob's smart phone and Acme's POS terminal or server in this example), and can be used for exchanges of private information.

FIG. 5B is used to describe loop-based authentication flow for the exchange of private information that is to be kept secret from all parties other than Bob and Acme. In FIG. 5B, the same numerals are used as were used in FIG. 5A to refer to like operation. For example, as before, it is assumed that Bob's device is used to visit another device connected to the secure network (Acme's POS terminal or a transaction server), per numeral 503. However, in this case, it is also assumed that a PSK has already been selected (optionally using the process of FIG. 5A) and that Bob now wishes to exchange private information with Acme. Processes performed by Bob's device (218) in encoding private information are represented by box 552, and result in Bob's device doubly-avatarizing the private information. Per numeral 553, Bob's device generates appropriate headers (for example, identifying Bob's unique ID, the destination site corresponding to Acme, and a time stamp, session ID and/or field ID) to identify the private information to be encrypted. Per numerals 554 and 555, the private information is encrypted a first time using the private session key (PSK), and then the result of this operation is again encrypted using the secret key Bob's device uses to connect to the secure network (key$_{Bob}$), to form an avatar payload (i.e., "msg1"). This information is then sent via an unsecure connection (417) to the destination device (221) corresponding to Acme.

Processing by the destination device is represented by numeral 513. As before, Acme cannot decode the received avatar, e.g., "msg1" (514), though it does further encrypt this message using its trusted connection shared key (key$_{Acme}$) to form a second message ("msg2"). Using received headers, it then routes this information to the secure network, per numerals 516, 517 ad 558. This information is then relayed hop-by-hop through the secure network, just as before, back to the domain node for Bob's device (218). Each node along this path decodes the received information using the secret key used for the incoming hop path, and re-encodes the received information using the secret key for the outgoing hop path, at all times exclusively using the trusted connections (see dashed line ellipses in FIG. 4) for this transmission. The information as before is routed to the hub (524) and then to Bob's domain node (529), which is in possession of key$_{Bob}$. Doubly-avatarized information received by Bob's domain (i.e., the originating device domain) is partially decrypted according to key$_{Bob}$ (562) to recover singly-avatarized information (i.e., information still encrypted according to the PSK, which is not in the possession of the originating device's domain); the private information is thus still encrypted at this point and is not shared with the domain and remains indecipherable. As indicated by numeral 563, the originating device's domain then retransmits this partially decoded (i.e., singly-avatarized) information back through the secure network, with this information being again doubly-encrypted using the shared key for each hop, and then partially decrypted (i.e., back to the singly-avatarized information) at the ensuing node, and so forth, until the information reaches the destination device (e.g., Acme's POS terminal). Since this terminal is in possession of both the shared key used for the last hop ($key_{Acme}$) and the PSK, it can doubly-decode received information to recover the private information (564). The result is that secret information is shared using an untrusted connection (417) to communicate an avatar, but decoded private information is exchanged through a trusted, secure network (i.e., independent of the untrusted connection) in a manner decipherable only by Bob and Acme. Because the information comes through the secure network, only through known, trusted connections, Acme can attach confidence to the representation that the information truly comes from Bob's device, and because it travels through a path independent of the untrusted connection between Bob's device and Acme, the information is immunized from attacks predicated on the untrusted connection.

FIG. 5C is used to describe loop-based authentication flow 571 in one embodiment, that is, for the exchange of federated credentials between Bob and Acme. This flow can be used whether or not the previously described infrastructure is also used for PSK exchange and/or the exchange of private information. However, in one embodiment, using both of the processes represented by FIGS. 5A-5C together synergistically imparts confidence and credibility to the system; that is, the federated credentials' verification process referred to below, if used in connection with the other processes, also provides another motivation for attaching confidence to the representation that the information originates from Bob. For example, if Bob desires to effectuate an online transaction with Acme, Bob will typically submit a credit card number (i.e., a federated credential) and authentication information compatible with legacy payment clearing processes (i.e., private information such as Bob's credit card statement address/city/state/zip, Bob's name as on the credit card, card verification value or "CCV," amount authorization, and similar types of information). In such an example, the PSK-generation process of FIG. 5A can be used to establish handshake and enable the private information exchange process of FIG. 5B, and the federated credentials sharing-and-verification-process of FIG. 5C can be used in connection with the same online session to verify that the federated credential originates from Bob (as does the furnished private information, by virtue of its association with the same online session and series of information exchange). For example, each exchange can feature headers that utilize source/destination identification, time stamp identification (e.g., a monotonically increasing series of time stamps within a time-out range or a fixed time stamp generated at first session access), or other form of session and/or field identifier; this information can be used by the software of the originating device, the destination device and points in the secure network to associate avatar packets and other information exchanges with a common session or transaction, at least some of which are verified as representing authorized use of Bob's federated credential(s).

Returning to FIG. 5C, reference numerals from FIGS. 5A-5B are used to describe like processes. For example, it is assumed once again that Bob's device (218) has been used to access a destination device (221) via an untrusted connection (417). Processes performed by Bob's device (the originating device) to generate an avatar for a federated credential are generally represented by numeral 572. More specifically, per numeral 573, Bob's device once again generates header information and selects the credential to be conveyed. An avatar is then created (575) using the secret key that Bob's device uses for its connection to the secure network (msg1=fn{$key_{Bob}$,credential}). This information is then sent to the destination device via the untrusted connection, and Acme then forwards this information through the secure network. At each hop from Acme to the hub and then to Bob's domain, the avatar (msg1) is again encrypted using the shared secret key pertinent to the particular hop, and then is partially decoded at the receiving end of the hop, only to be re-encoded by the key for the next hop, and so on (e.g., per numeral 576). When the information is received at Bob's domain, it is decoded using $key_{Bob}$ to obtain the original credential (e.g., a clear text credit card number, per numeral 577). Bob's domain then routes it back through the secure network to the hub, once again with this information encrypted for each hop and then decrypted (578, 541). The processing is however, slightly different than indicated by FIGS. 5A and 5B when this return information arrives at the hub; the hub decodes the credential from the prior hop and it performs an integrity check on this information, comparing it to information stored in its database (see, e.g., numerals 225 and 229 from FIG. 2). As noted earlier, to deter hacking of the hub's database, stored information can be encrypted and/or hashed, and the hub can perform a similar process for the federated credential in transit to Acme to verify its association with Bob, with the hub not retaining a copy of the clear text credential. The hub's software compares the header information (i.e., identifying Bob as a party to the communication) and matches this to the information stored in its credentials database (581), i.e., if someone other than Bob is attempting to use Bob's credit card, an exception process (583) can be triggered which effectively impedes consummation of the underlying transaction; this information can then optionally be used to trigger a fraud alert (584). Note that many types of processes and checks can be performed, e.g., the hub can, if Bob's device is unrecognized, ask Bob to enroll a new device before the transaction is allowed to proceed (585), or it can take other much more sophisticated actions (e.g., match originating device header information to the GPS position of Bob's smart phone); many actions or scripts are possible dependent on preferences of the system designer. It is also possible to outsource these checks to a third party (e.g., the hub can refer the federated credential to a third party destination, e.g., a credit card company, for credentials verification, thereby using a verification entity that is not always part of the path used to couple Bob and Acme via the secure network). If the federated credential is determined to be used in a manner consistent with proper usage by its owner, then this message can be forwarded through the secure network to Acme (582), optionally with a stamp (586) inserted by the hub to specifically report to the destination, Acme, that the credential is authentic.

Assuming the federated credential is authentic, it is eventually forwarded to and decoded by Acme using $key_{Acme}$, and then can be subject to legacy processing. For example, Acme might be required to perform payment clearance by submitting a corresponding credit card number, CCV, card expiration date (and similar information) to a credit card company to effectuate transaction completion, and Acme therefore might acquire each of these pieces of information to satisfy legacy credit card clearance processes.

FIG. 6A provides a table 601 that lists an exemplary set of federated credentials, including social security number ("SSN"), passport number, driver's license number, Visa CCN, AMEX CCN, Mastercard CCN, Discover CCN, credit card number expiration, CCV, account number (e.g., bank account number), web domain (e.g., employer), redress number, and potentially many other types of information. Note that this information is listed under the header of field (e.g., "SSN") and an associated field type (e.g., "FED," signifying a federated credential). In one embodiment, a web site or electronic application is designed by the destination (e.g., Acme) to link each field for which information is required from Bob with a field type—the transaction processing software on Acme's systems is coded to recognize that, for fields associated with the "FED" type, such does not require use of a PSK for decoding, and it performs avatar acceptance, routing to the secure network and decoding in dependence on this field type, effectively applying a process geared for acceptance and clearance of federated credentials using loop-based authentication techniques, such as detailed in FIG. 5C. Because this web form is downloaded to Bob's domain, its design effectively instructs Bob's device how to process each field, e.g., as representing a federated credential, private information, or in connection with another field type (e.g., for other embodiments).

FIG. 6B provides a table 603 that lists an exemplary set of private information types, e.g., in one embodiment, private information is similarly type-coded by field so that the destination device (e.g., Acme's system) "knows" to use PSK processes and to route values submitted for these fields in accordance with the processes of FIG. 5B. More specifically, in this exemplary list, fields are associated with a field type of "PVT," representing private information; listed fields include home street address, residence city, state, zip, country, phone, mother's maiden name, home phone, cell, company name, business street address, business city, business state, business zip, business country, business phone, password, login name, date of birth, payment token, a time stamp (YYYYMMDDHHMMSSSS), session ID, web form field ID, quantity, challenge 1, challenge 2, comment, and potentially many other types of information.

Note that while two field types are indicated by FIGS. 6A and 6B, in some embodiments, field types are not used at all, while in others, one, two, or more than two field types can be used, all as pertinent or desirable for the particular implementation.

FIG. 6C provides an example of a format for an avatar packet 605. As seen in this figure, the packet has fields for header information that include an identifier of the avatar system and the root or hub, a unique client ID (e.g., Bob's email address), a sender IP address, destination IP address (or web address), a unique ID for the destination system, a time code, a session ID/field ID, other information to be conveyed and encrypted (e.g., $G^B$), avatar type (e.g., "federated credential") and the avatar payload (i.e., the encrypted, avatarized data). Session ID and field ID can be used by the destination device to ensure that de-avatarized information is sorted to and stored in association with the proper field and field type of a web form, for a session specific to a particular user (i.e., a particular originating device). Other types of information can be included, and fewer, greater or different types of header information can be included. Note that in one embodiment, is preferred not to include Bob's email address in the header for safeguarding privacy of the originator in a transaction; to provide for effective identification to the network of Bob's domain server, the software on Bob's device can insert a prearranged code coupled with a set of shared random tag strings mutually agreed to between Bob and his domain server. The prearranged code can, for example, be used to identify Bob's domain to the network, and the prearranged codes (e.g., dynamically generated) can be used to enable Bob's domain to identify communications as originating with Bob's device; many similar examples are possible. The depicted information is used to cause systems (e.g., such as the destination device and nodes in the secure network) to recognize that the packet is to be forwarded to the secure network as containing an avatar, and is used to permit identification of routing information needed to convey the forwarded avatar to Bob's domain, and to also permit return of information through the secure network to the destination device (i.e., to Acme).

Having thus described system flow, this disclosure will now proceed to describe the structure of software (instructional logic) to perform various tasks in association with the flow represented by FIGS. 4 and 5A-5D. FIGS. 7A-7E will be used to describe operation flow from the perspective of different structural elements in the network for example, from the originating device (FIG. 7A), the destination device (FIG. 7B), a node somewhere in the secure network (FIG. 7C), the originating device's domain (FIG. 7D) and the hub (FIG. 7E). A sample transaction will then be narrated, relative to FIGS. 8A-8E.

Figure 7A:
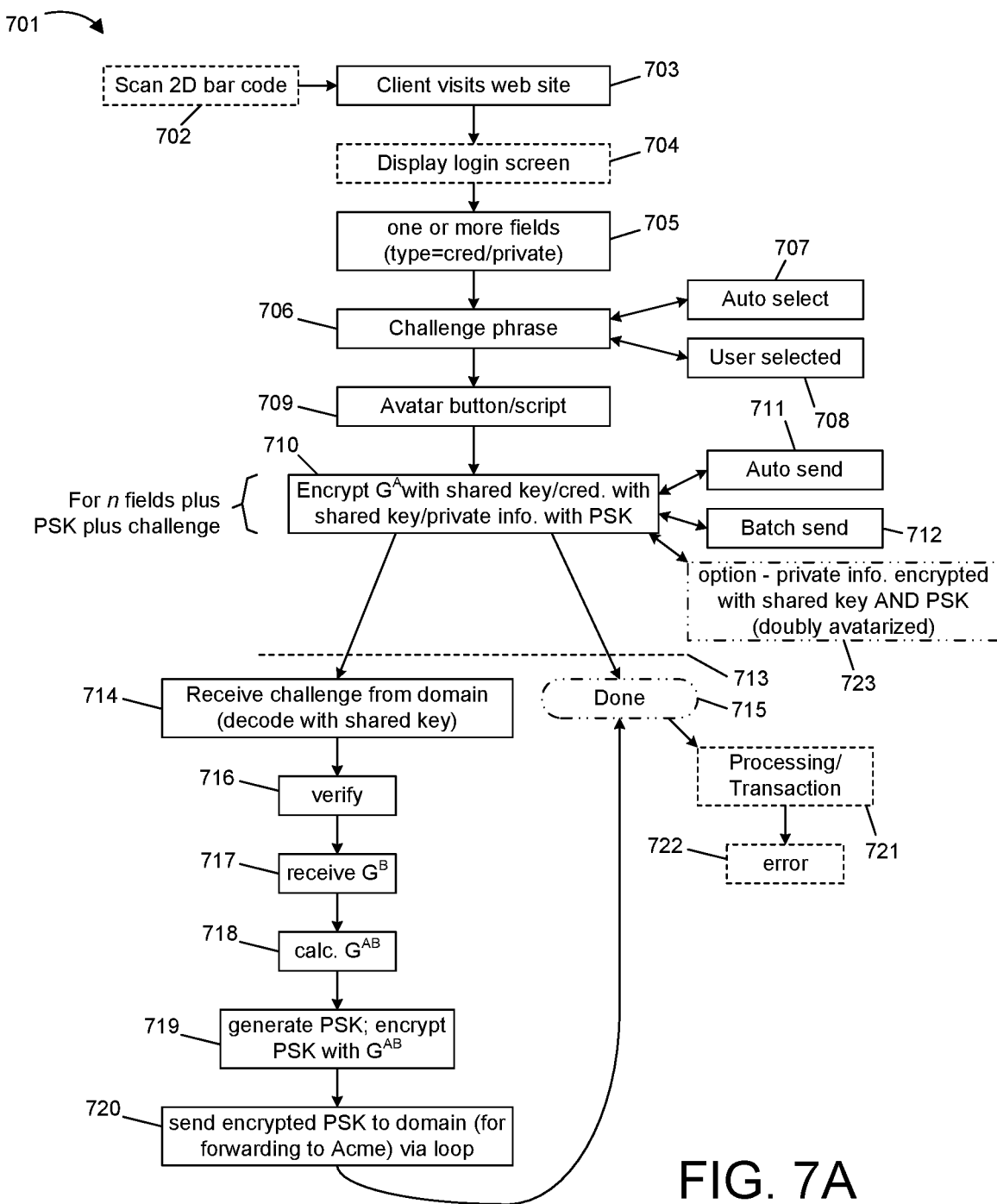
FIG. 7A is a flow diagram representing software operation from the perspective of a client device (e.g., from the perspective of "Bob's smart phone").

As indicated, FIG. 7A provides a flow chart 701 used to describe software operation and flow from the standpoint of a client device. Thus, this flow chart 701 represents operations that would be undertaken by a client transaction module or the software components or modules it installs on a client device. As described previously (see the discussion relative to FIG. 3, above), the software typically will also include a setup module that configures the client device, for example, establishing a trusted connection to the secure network, including related installation of a shared secret key used for that connection and the avatar process, and installation of suitable encryption/PSK generation modules and any needed plugins, extensions or executables to generate avatars when needed and transmit those avatars to destination devices. As noted previously, in one embodiment, the shared secret key is stored in protected memory, with the encryption/PSK generation software operating in or creating a secure container, such the shared secret key is not externally accessible, and such that operands (e.g., challenges, various pieces of information) are inputs to this software and result in encrypted (avatarized) outputs from which the shared secret key is not identifiable.

More particularly, when and as an originating device is actuated to download a web page or receive an external input, a plugin installed by this software (e.g., as a web browser extension or operating system service) causes a processor of client device (e.g., Bob's smart phone) to recognize sites that suitable for use of the avatar system. This recognition can be accomplished in a number of ways, but as indicated by numeral 702, one optional way this can be done is by presenting a 2-D bar code (QR code) that Bob images with his smart phone's camera, and that then triggers an executable on Bob's smart phone to (a) automatically identify Acme, e.g., as a vendor, and a destination IP at Acme for transactions, (b) identify an item being purchased, and (c) invoke the avatar system to automatically and transparently to engage Acme's transaction server using the avatar system. For example, scanning such a code can cause Bob's smart phone to immediately tally one or more items for purchase, receive via the Internet (or Bluetooth connection) a web-form to be completed for purchases, automatically (internally to Bob's device) populate the form with a credit card number and other transaction information (e.g., Bob's statement address, email address and so forth), display a confirmation screen on Bob's smart phone to confirm purchase, and responsively transmit avatar packets to Acme's site; the software then transmits avatar packets to (a) establish handshake and a shared PSK with Acme's transaction server, and (b) for each given field in Acme's form, exchange one or more avatar packets respective to the given field. The software on Bob's phone encrypts the information as appropriate (in order to safeguard the information transmitted, e.g., over the unsecured Internet or a Bluetooth connection), it receives a forwarded challenge which verifies that Acme is a member of the secure network, and it then exchanges information via the secure network in response to each avatar. As noted above, a hub can provide services of monitoring communication, detecting fraud, validating authenticity of the party presenting credentials, and other related functions. When Bob checks out of Acme's store, Bob's software can receive and display a receipt and confirmation on his cell phone (or a bar code scanned by Acme at checkout) that confirms purchase and/or prints a receipt. This example provides but one model that can be used to provide for an automated purchase, and clearly many other models are available. As an alternative, Bob's software could simply relay on a browser plugin to recognize sensitive fields, in much the same way as is done today to selectively detect and encrypt field-specific information sent today via the Internet. Other examples will also be apparent to those skilled the art.

In FIG. 7A, it is once again that Bob has engaged with Acme such as by visiting (or being directed to) a web site 703. Bob's software optionally causes his device (e.g., smart phone) to display a login screen which requires biometric authentication, or that Bob enter a password in order to use the avatar system; whether or not such a login is required will be a design choice. For example, in connection with the automated purchase application just referenced, in which Bob's credit card number was prepopulated into one or more fields of Acme's web form, it might be desired to require a password to prevent Bob's smart phone from being used for purchase if the phone is lost. In a different hypothetical system, a web browser plugin might require Bob to enter his credit card information manually, in which case such a login might not be required, e.g., if Bob's phone was lost, a malfeasor might have no way of knowing Bob's private information or credentials. Clearly many examples are possible. In either case, Bob (or his smart phone) enters field information into the web page as desired, per numeral 705. Each entered field can be associated with a predetermined field type (e.g., PVT/FED) as previously discussed, with this information being processed in bulk or individually. Either when the avatar plugin is launched or when Bob elects to proceed, a challenge phrase (706) can then be selected to perform a handshake with a destination device via the avatar system; in one embodiment, such a challenge phrase can be auto-generated (e.g., a cryptographic function of a time stamp or information randomly selected by Bob's device), per numeral 707 and, in other embodiments, this challenge phrase can be entered by Bob (708). Bob's device can then optionally present Bob with a splash screen querying whether he wishes to continue; should Bob indicate that he does, the software on Bob's device can automatically effectuate handshake with the destination device (e.g., at Acme). For example, a web browser such as Internet Explorer (Edge), Mozilla Firefox or Google Chrome can be configured to memorize values for fields of frequent-used login screens and to prepopulate those fields when one revisits a site; such a splash screen can query whether Bob wishes to proceed with the prepopulated values for these fields, and then to automatically submit these values using the avatar system. Depending on application, if an error is made by Bob for any particular information, then the pertinent field can be highlighted (e.g., with Acme sending a message to Bob's device via the unsecured connection indicating that one or more field values are unrecognized or are in error). Should Bob elect to proceed, for example, as indicated in response to a splash screen as referenced, Bob's device then transmits the information via the unsecured connection to the destination device at Acme as a sequence of one or more avatars (e.g., one or more packets). This action is variously represented in FIG. 7A by reference numeral 710; that is to say, the software on Bob's device causes that device to encrypt each of the various fields as a string of avatars, including avatars to convey handshake information (e.g., $G^A$) and, once a PSK has been set up, federated credentials and private information, in the manner previously described. These actions can be automatically and transparently performed (711), e.g., each time a user hits "enter" after filling in a particular field, or on a batch basis (712), for example, if the software queries Bob for a "submit command." In one embodiment, there are at least n+2 avatars or avatar packets created on the basis of n fields, with the two extra ones used for handshake (challenge/$G^A$/$G^B$) exchange, and exchange of a PSK.

Dashed line 713 represents a visual partition between functions performed by the originating device in creating avatars (above the dashed line 713) and in responding to forwarded information from Acme (below the dashed line 713). For example, after sending avatars, Bob's device will receive a message from Bob's domain encrypted using the secret key that Bob shares with his domain. Bob's device decodes this message to receive Bob's original challenge phrase, authenticating that the inbound communication was in fact prompted by Bob and represents Acme's relay of information through the secure network (714). Verification of this challenge phrase (716) causes Bob's domain to return a decoded $G^A$ back to Acme. At the same time, Bob's domain forwards information from Acme (i.e., representing $G^B$) to Bob's device, which is similarly decrypted to recover $G^B$ (717), recognize from headers that this information is to be combined with the information (A) generated by Bob's device, and cryptographically compute $G^{AB}$ (718). The software on Bob's device then selects the PSK according to any desired protocol (e.g., typically having a long key length, e.g., 2k bits plus), and it encrypts this information with $G^{AB}$ (719) and sends it to Bob's domain for forwarding to Acme via the secure network loop path (720). Note that for ensuing exchanges of private information and submission of federated credentials, decoding is performed by Bob's domain and need not directly involve Bob; thus, ostensibly, the software on Bob's device need not take further action other than transmitting avatars to the destination device once a PSK has been exchanged, as represented by a termination function 715. Per numeral 721, processing or transaction consummation can thereafter be performed by Acme. As referenced previously, if an avatar represents erroneous information (e.g., Bob mistypes a field), this can be relayed to Bob's software from the destination device directly through the unsecured connection and displayed on a display screen of Bob's device (722). As discussed earlier, and also underscored by reference numeral 723, in one embodiment, private information exchange is optionally fulfilled using double-avatarization.

Figure 7B:
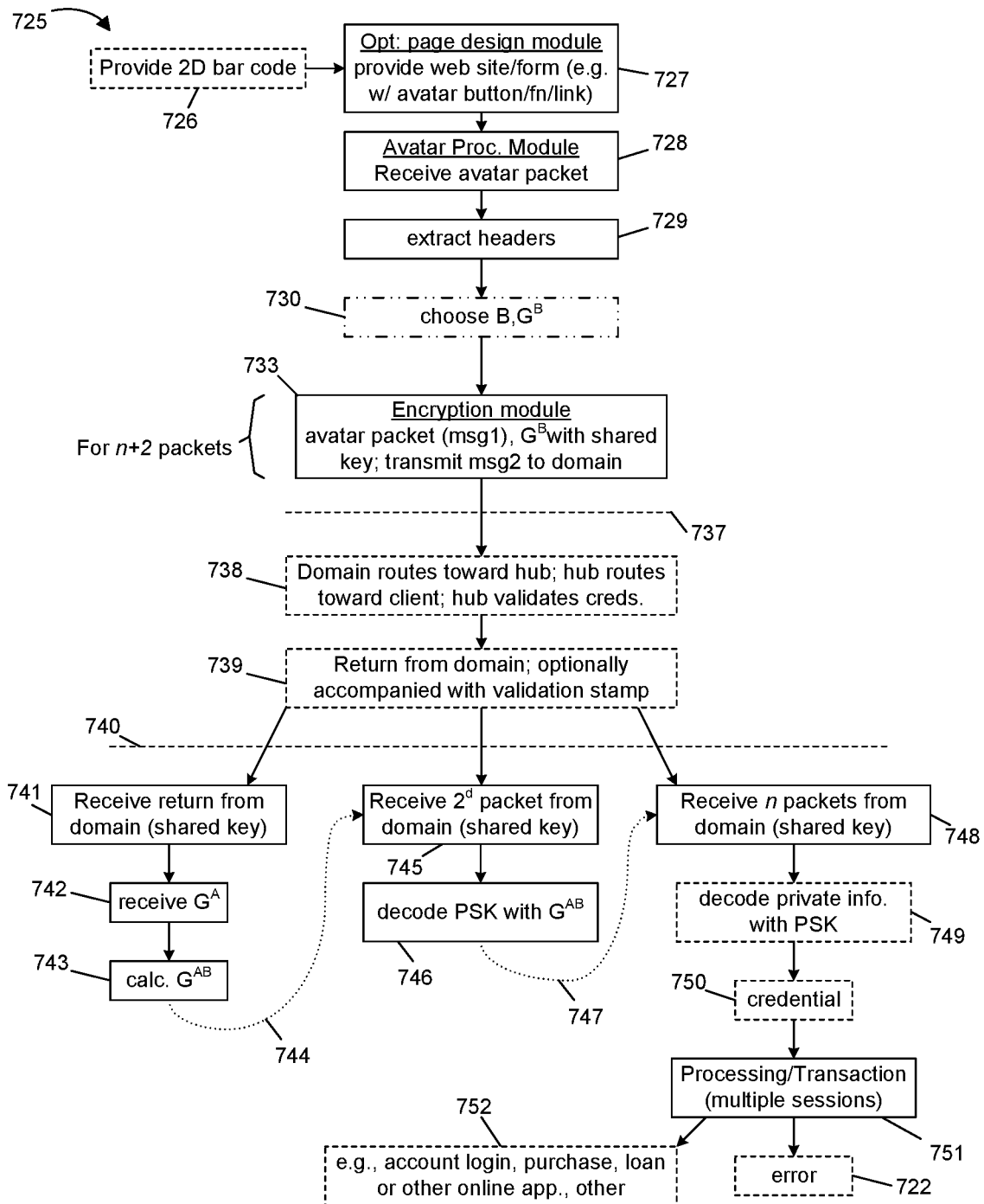
FIG. 7B is a flow diagram representing software operation from the perspective of a destination device (e.g., a device servicing a point-of-sale "POS" or online transaction for "Acme").

FIG. 7B provides a flowchart 725 showing software operations from the perspective of a destination device, such as Acme's POS terminal or transaction server, per the aforementioned examples. In a manner consistent with the example presented previously, Acme optionally makes a 2-D bar code (e.g., QR code) available for scanning in a point-of-sale or other embodiment (726); optionally, this function can be performed as a distinct module of the software running on a single machine or associated systems. In another embodiment, such a code can be created offline or independently of the depicted software (e.g., it can be printed in a magazine, or on a loan or state ID application, or other type of form). Irrespective of whether clients, such as Bob, are to be specially directed to the destination machine, the destination machine or associated systems provide a web site or form (727) for download by originating devices, such as Bob's device, for entry of one or more fields of information. The generation of such a form can be an function of an optional page design software module or plugin adapted to provide for web form design or assist with web form design to embed codes in the web form that will be downloaded to indicate to each originating device that the avatar system is to be used; for example, in connection with web form design, the system can insert an electronic code suitable to cause originating devices to invoke an avatar plugin when the web form is used, either in general or on a field-specific basis. As indicated by function box 727, optionally, the presented web site or form can include scripting or code to provide a selectable function, or a dedicated avatar button or link which permits devices downloading the web page or form to selectively launch avatars to the destination device (see, e.g., function 704 discussed in connection with FIG. 7A, above). Note that the page design software module can generate scripting so as to cause each participating device to transmit avatars to a dedicated port or destination associated with the destination device.

As with each participating device, a setup module (not referenced in FIG. 7B), e.g., using the process discussed with reference to FIG. 3, can be a part of the software on the destination device. This module establishes a secure trusted connection for each destination device to connect to the secure network; for example, if the avatar system is to be used by a retailer having multiple POS terminals, the appropriate software modules can be downloaded to each POS terminal and a server (or multiple servers) for the retailer, and used to establish trusted connections using a shared secret key for each POS-terminal-to-server connection, and from each server to an established node on the secure network.

An avatar processing module of the software receives incoming avatar transmissions (728) and parses header information (729) to establish sessions with each individual originating device, add pertinent header or other information, and forward avatars (and track forwarded avatars sent to) the secure network. If an inbound avatar packet indicates that it is of a type that is attempting to generate a PSK, the avatar processing module causes one or more processors of the destination device to generate secret information (B) that will result in information ($G^B$) added to the avatar packet (730) as it is relayed to the secure network; as noted previously, although a logarithmic notation is used here, alluding to Diffie-Hellman key exchange, any appropriate (secret) symmetric key sharing process can be used. For all inbound avatars (whether or not PSK generation information is added), an encryption module of the software encrypts these avatars using the secret key shared by the destination device and its secure network parent (733) and forwards this encrypted information to the secure network via the trusted connection of the destination device. As with the participating devices discussed above, in one embodiment, the software uses protected memory or other hardware, or otherwise establishes the encryption process in a manner resilient to hacking of the shared secret key of the destination device, e.g., such that the shared secret key cannot be externally accessed.

Dashed lines 737 and 740, and the region there between, denote actions that can be taken by the secure network, i.e., the destination device forwards avatars and then for each of (n+2) avatars, awaits return of information from the network. More specifically, the domain of the destination device routes forwarded avatars toward the hub, or otherwise to the domain of the originating device of the avatars, and the network provides returns of information (including any validation of federated credentials, as appropriate) (738); per numeral 739, the domain of the destination device returns de-avatarized information representing validated federated credentials. As noted above, this returned information can optionally be accompanied a signature (hash) or other validation stamp applied by the hub or validation service, e.g., encrypted according to a private key of the service and verified using a public key of the service to confirm authenticity of the signature.

The destination device, upon obtaining returns of information, then engages in a number of operations (i.e., below line 740) depending on the type of avatar packet being processed. Note that, as appropriate, the avatar processing module of the destination device can clear a queue corresponding to avatars in flight for information that has been returned for the specific session and also selects the pertinent PSK for the individual session (if multiple transactions or sessions are being processed in parallel). If the particular avatar being processed relates to PSK generation, then pursuant to function blocks 741, 742 and 743, a first returned avatar packet is decrypted according to the shared key of the destination device ($key_{Acme}$) to obtain recovered $G^A$, and is then used to calculate $G^{AB}$, as has been previously described. Per numeral 744, the software then looks for the second avatar packet which it similarly decrypts using the shared secret key of the destination device (745) to receive the de-avatarized (but still encrypted) PSK, which it then decodes using $G^{AB}$; the destination device is then in possession of the PSK, which it can apply (per path 747) to the decryption of ensuing avatar packets corresponding to the same (e.g., tracked) session. The destination device then receives at least one packet of returned information for each field for which a user such as Bob decides to supply values (e.g., an erroneous entry by Bob can potentially result in receive of multiple avatars for a given web form field), which it decodes, once again, according to the secret key used by the destination device for its trusted connection to the secure network (748). Per numeral 749, private information will still be singly-encrypted and need to be decrypted using the PSK to obtain the information shared of the originating device, and per numeral 750, credentials are not so encrypted. The destination device then stores the decoded information to memory in association with the pertinent web for field for the pertinent transaction, and then performs legacy processing (751); as noted, the software destination device is advantageously structured so as to manage multiple sessions concurrently and to sort information for interleaved avatars from different originating devices to the proper field and proper session, dependent on header information returned with the packet. Also note that if Acme is to store any of Bob's federated or private credentials, it might be desired best to mask the field of display completely or at least its major parts; for example, a credit-card number "0123-4567-8888-9999" might be masked as "**---99." This precautionary measure can help mitigate breach-exploit attacks that attempt to expose finite-sized identity text fields in a web form; furthermore, if desired, high entropy padding methods employing a format-preserving encryption ("FPE") cipher can also be used to deter breach (e.g., such that Acme for example stores only encrypted fields). Other measures can also be optionally employed.

Figure 7C:
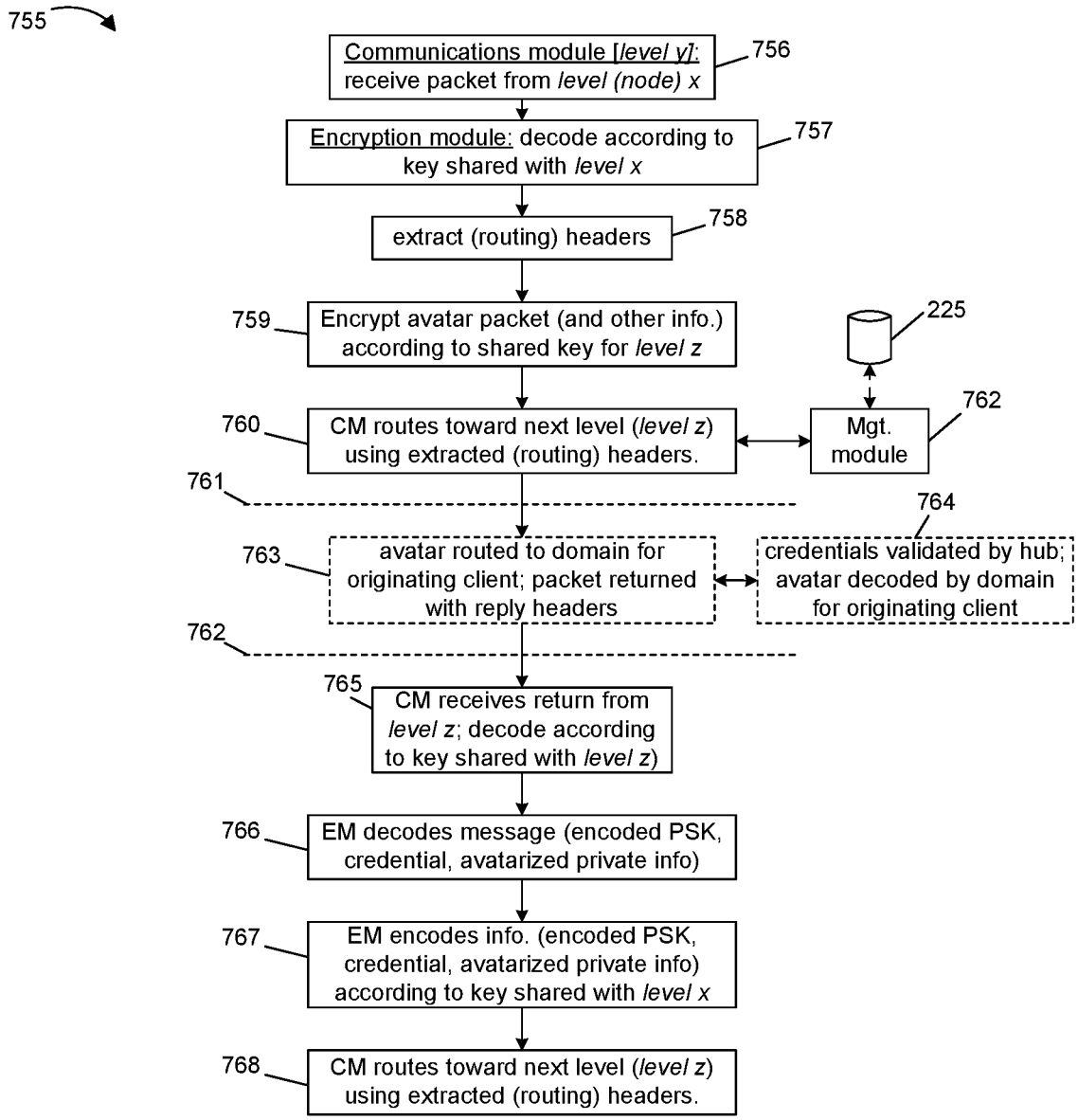
FIG. 7C is a flow diagram representing software operation from the perspective of a generic node (e.g., a domain server at any of level 1, level 2, . . . level n−1, and the hub from FIG. 2).

FIG. 7C provides a flowchart 755 associated with software functions at an intermediate node of the secure network. Generally speaking, the functions of such a node are primarily to (a) communicate with other nodes of the system, e.g., using a communications software module, (b) perform encryption and decryption functions in association with communications, i.e., using the shared secret key for each respective hop pertinent to the particular network node, via an encryption module, and (c) locally store network map information sufficient to perform any necessary routing to one or more other nodes of the system, using a management module that interacts with the hub (and its database 225) as appropriate. The respective software functions are depicted in FIG. 7C. For example, per numeral 756, a communications module for the node (e.g., "node y") receives communications from another node (e.g., "node x") which have been encrypted according to the shared secret key pertinent to the associated trusted connection path. Software associated with the encryption module causes node y to decode these communications (757) to recover an avatar; the communications module also extracts headers (i.e., routing information) from the inbound packet, as appropriate (758). The encryption module software then causes node y to re-encrypt the recovered avatar (and other pertinent communications) (759) using the shared secret key pertinent to a hop between node y and an ensuing node, node z. The communications module interacts with the management module as necessary to adjust any forwarding headers, obtain an updated network map, or otherwise perform routing as appropriate, and it then sends the re-encrypted information on to node z.

Once again, two dashed lines, 761 and 762, demark processing performed elsewhere in the network; the ensuing one or more nodes route the forwarded avatar (and other pertinent information, e.g., $G^B$) to the originating client to recover avatarized information, which is then returned by the network, with any credentials validation service appropriate performed by the hub or a third party validation service (763/764). As denoted below dashed line 762, once node y receives this return of information (e.g., per numeral 765 from node z), the communications module passes the information to the encryption module which decrypts (766) the information according to the proper shared secret key and then re-encodes that information (767) for transmission to node x. The communications module then routes this encrypted information back to node x, as appropriate (768). Note that the described methodology applies for most any node in the secure network, e.g., node x can represent the destination device of Acme, while node z can represent the hub or the domain of the originating device. Also note that while the use of a reciprocal path is represented by this FIG. (e.g., a return of information from Bob's domain is illustrated as traversing the same path used to forward the avatar, but in reverse), this is not required for all embodiments, e.g., in one embodiment, the return of information is allowed to take a different path than the avatar from the destination device.

Figure 7D:
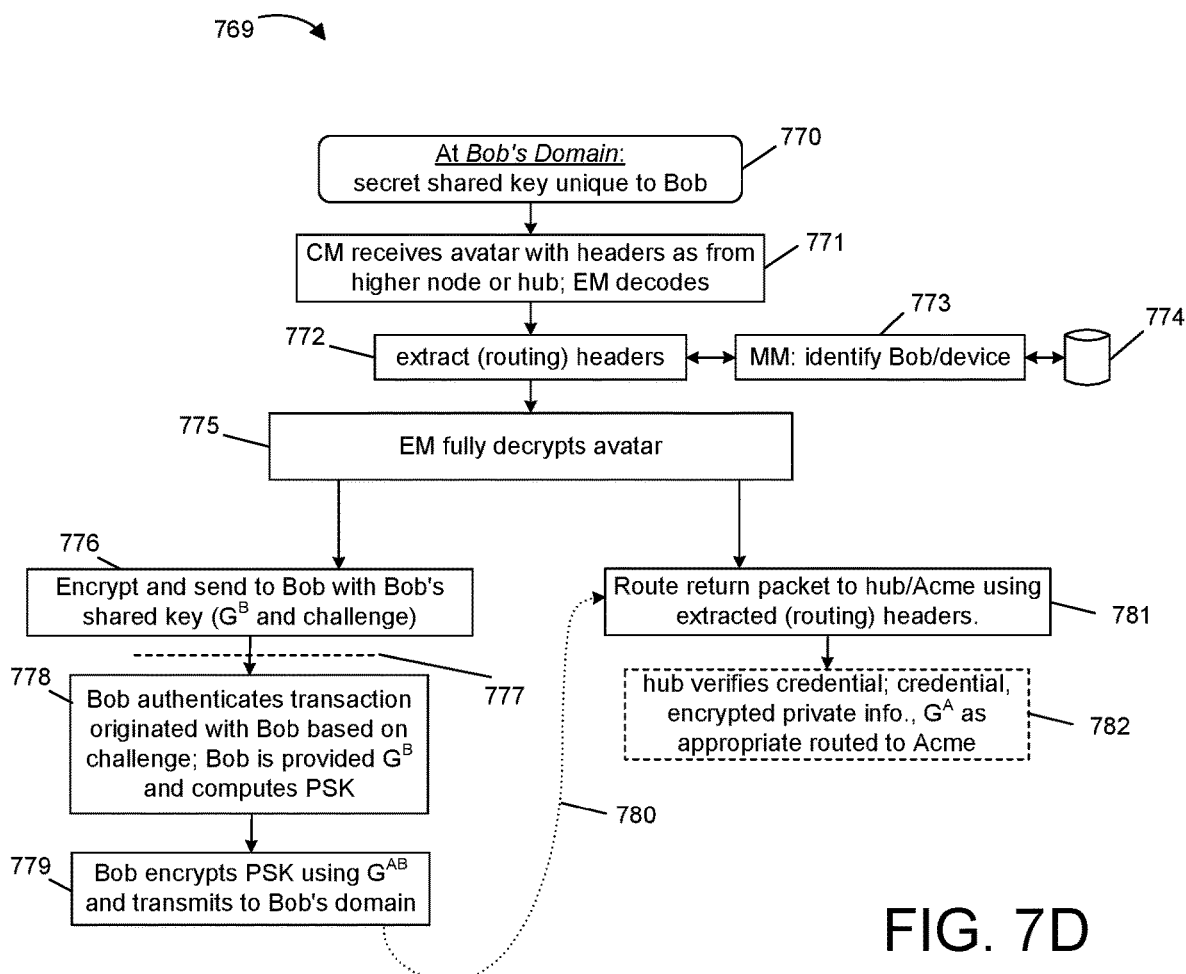
FIG. 7D is a flow diagram representing operation from the perspective of a domain server that directly services a client (e.g., Bob's domain server).
Figure 7E:
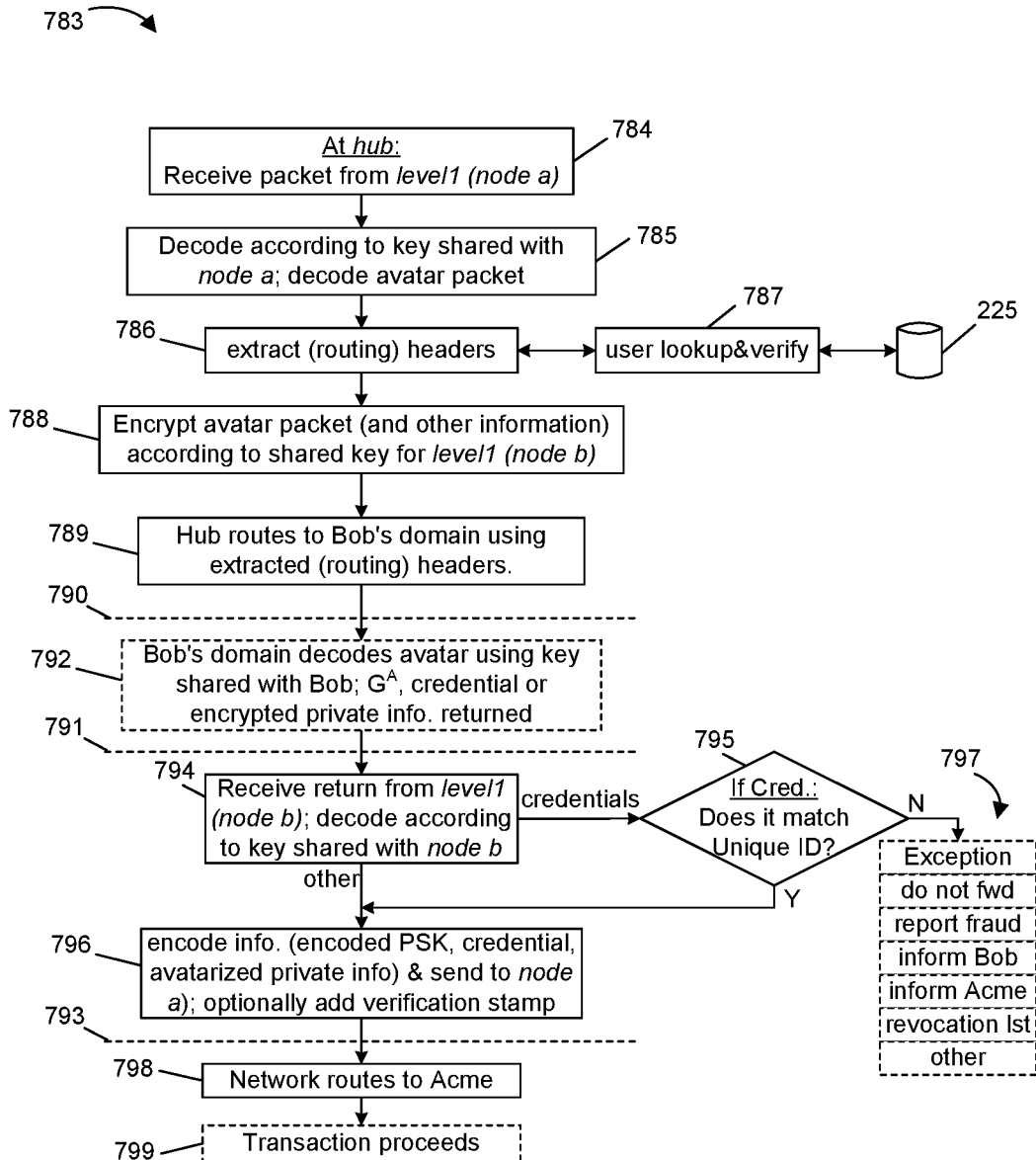
FIG. 7E is a flow diagram representing software operation in one embodiment from the perspective of a trusted third party (e.g., the hub from FIG. 2).

FIG. 7D provides a flow chart 769 showing processing from the perspective of Bob's domain. As indicated by an offline data block 770, the machine (e.g., server) managing Bob's domain possesses a key for each client device managed by that machine. The machine receives and decrypts incoming information from a trusted network connection using a shared secret key pertinent to that connection (e.g., $key_{Bob's\ domain}$) to recover the avatar and any accompanying information, such as $G^A$ in the case of a PSK exchange, using once again a communications module (CM) and an encryption module (EM). From administrative information maintained by a management module and from inspected headers (771), the machine determines that a particular incoming avatar packet is associated with Bob's device and it retrieves the shared key pertinent to the trusted connection with Bob's device (i.e., $key_{Bob}$ from the previous examples). For example, the communication module can extract (772) the headers and observe Bob's unique ID (e.g., Bob's email address) and identify the particular device of Bob associated that domain (773), with a management module (MM) accessing a locally stored database or table (774) to obtain the proper key (e.g., $key_{Bob}$); if Bob has multiple devices using the same domain, it is possible to use a device ID to discriminate between devices, or alternatively, to simply use each key associated with Bob's unique ID until a match is found. As mentioned earlier, it is also possible to use a set of prearranged random tag strings, unrelated to Bob's email address or device identifier, to permit Bob's domain to specifically identify Bob's device as a source of avatar origination; such tag strings can be generated for example according to a hash table shared between Bob and his domain server, with the tag strings being structure such that a third party observing network traffic packets cannot deduce Bob's identity from the history of such packets. Other alternatives will also occur to those of ordinary skill in the art. Once a match is found, the encryption module causes the machine to fully decrypt the forwarded avatar using $key_{Bob}$ (775). At this point, information from decrypted avatars can be returned by the machine to the destination device via the secure network (e.g., optionally along the reverse path traveled by the avatar). If the particular avatar, however, is a PSK exchange avatar, information conveyed by the first avatar packet is encrypted with the key for Bob's device and sent to Bob's device per numeral 776; for example, this information can include one or more challenge fields and secret information $G^B$, provided by the destination node. At the same time, as noted earlier, the machine for the domain encrypts the decrypted avatar ($G^A$) and returns this information through the secure network to Acme (781). Dashed line 777 is used to demark functions further taken by Bob's device relative to the information forwarded to it; as referenced earlier, these functions include authentication of the challenge to ensure that Bob's avatar was the origin of the received information, computation of $G^{AB}$ from the information provided by its domain, and selection of a PSK (778). Bob's device then encrypts this PSK using $G^{AB}$ and forwards the encrypted information to the machine managing the pertinent domain (779). Numeral 780 references this return of this information to the machine for the domain, which then piggybacks the encrypted PSK on to the second avatar packet received from the secure network and forwards this through the secure network to the destination device (781). As once again referenced by numeral 782, any returns sent to Acme are advantageously processed, in the case of federated credentials, to either process decoded information to authenticate the holder of the credential, or to refer such information to a third party service that will perform this verification.

Software processing of communications at the hub, in one embodiment, is referenced by numeral 783 of FIG. 7E. The depicted embodiment provides functions where the hub processes avatars being returned to the originating device's domain, in a first direction, and provides returns of information in a second direction, while optionally checking these returns of information to verify association of federated credentials with their true owner. Notably, a number of alternative configurations exist, including where federated credentials are routed to a third party validation service for processing (and then optionally being directed back to the hub prior to forwarding to the destination domain), and configurations where headers for all messages through the system are screened to verify that senders and recipients correspond to registered members of the secure network. Generally speaking, the hub software will include a communications module, an encryption module, a database management module (e.g., to manage maintenance of a network map and distribute of updates to that map, as appropriate, to various network participants, to manage a credentials database, and to screen new and existing network participants for reputation and history, per the functions referenced by numerals 225-230 of FIG. 2). In one embodiment, the hub also distributes (e.g., downloads) new software to various network participants (such as Bob's device, Acme's devices, and the various nodes of the secure network) and pushes software updates to those devices and nodes.

In processing communications, per number 784, the hub receives a packet from a level 1 node in the secure network (see FIG. 1); this node is referenced in FIG. 7E as "node a." The encryption module then decodes this packet according to the key used for the trusted relationship with node a, for example, to thereby recover an avatar (785). The communications module then uses extracted headers (786) to verify user location and identity (787), for example, in reference to a network map stored in database 225, and the hub then adds any routing information necessary to forward the avatar packet to the originating device's domain. The avatar is then encrypted (788) again using a shared secret key, this time according to the key shared with a different level 1 node (node b); note that it is possible for the avatar to be forwarded back to node a, e.g., as might be the case in a configuration where both Bob's device and Acme's terminal connected to the hub through a common hop path (in this latter case, the same key for node a would again be used for encryption). The hub then routes the newly encrypted information as appropriate (789).

At the domain for the originating device, as mentioned, processing is performed as depicted between dashed lines 790 and 791. That is, for example, Bob's domain decodes a received avatar using the key shared with Bob's device, and it returns a de-avatarized but still encoded secret value $G^A$, a federated credential, or singly-avatarized private information, as described previously (792). On this return of information, the hub then performs processing as depicted between dashed lines 791 and 793. For example, it receives a return of information from node b and decodes that information according to the pertinent key (794). As part of examining headers for the returned information, the communications module causes the hub to determine whether the returned information is a federated credential; if the returned information does represent a federated credential, then a test is performed (795) to determine whether the federated credential is being used by an entity associated with that federated credential; as indicated, in one embodiment, this test can be performed simply by determining whether the credential is represented in a credentials database managed by the hub (or validation service), for example, in reference to credentials database 229 from FIG. 2. In other embodiments, more sophisticated processing can be performed, such as interacting with a provider of the federated credential (e.g., credit card company) to verify validity, determining if the federated credential is identified on a revocations list, informing the originating device that the federated credential is unrecognized or is not approved, storing context data for the exchange for further use, and so forth. If the federated credential is validated, the hub then encodes the return information and forwards it back toward the destination device (e.g., through node a) via a trusted connection as has previously been described (796), optionally adding a verification stamp to indicate that the federated credential has been checked and determined to be authentic. If the validation fails, any one of a series of operations can be triggered (797), depending on system design, for example, generating an exception, dropping the information without forwarding it, reporting fraud (to the originating device, destination device or both) or otherwise informing Bob or Acme, adding the federated credential to a revocations list, and potentially other actions.

As indicated below dashed line 793, once return information has been forwarded by the hub, it is processed as has been described previously, that is, the network routes the information to Acme (798) which then proceeds with a transaction or other processing, as represented by numeral 799.

Note that the various software functions described with reference to FIGS. 7A-7E can be configured in a number of different manners. In one embodiment, the software is preinstalled on a piece of hardware (e.g., a computer, a smart phone, a point of sale terminal, and so forth). In another embodiment, these functions are provided as part of software integrated with system components, such as an operating system. In yet another embodiment, some or all of the referenced software can be downloaded from a server, or acquired on dedicated media (e.g., a disk), or adapted for application-based installation.

Also, while the software can be configured as various alternate download packages (e.g., one for browsing, such as on "Bob's smart phone" or "Bob's laptop," and another package for merchants (e.g., Acme's network)), it is possible to have one omnibus software package that installs itself as appropriate to the installation (e.g., as node software, per the representation of FIG. 7C, as avatar processing software, per the representation of FIG. 7B or 7D, or as client device software). Many examples are possible, with variations being customized as appropriate to the particular customer requirements or network configuration at issue. In one contemplated application, three different downloadable software packages can be provided, including a client version for installation on digital devices (e.g., of individuals), a server version (e.g., for installation on network nodes, such as a domain that manages other device or that otherwise routes communications through the network), and an apex version which provides hub and other administrative capabilities such as noted above.

Figures 8A, 8B:
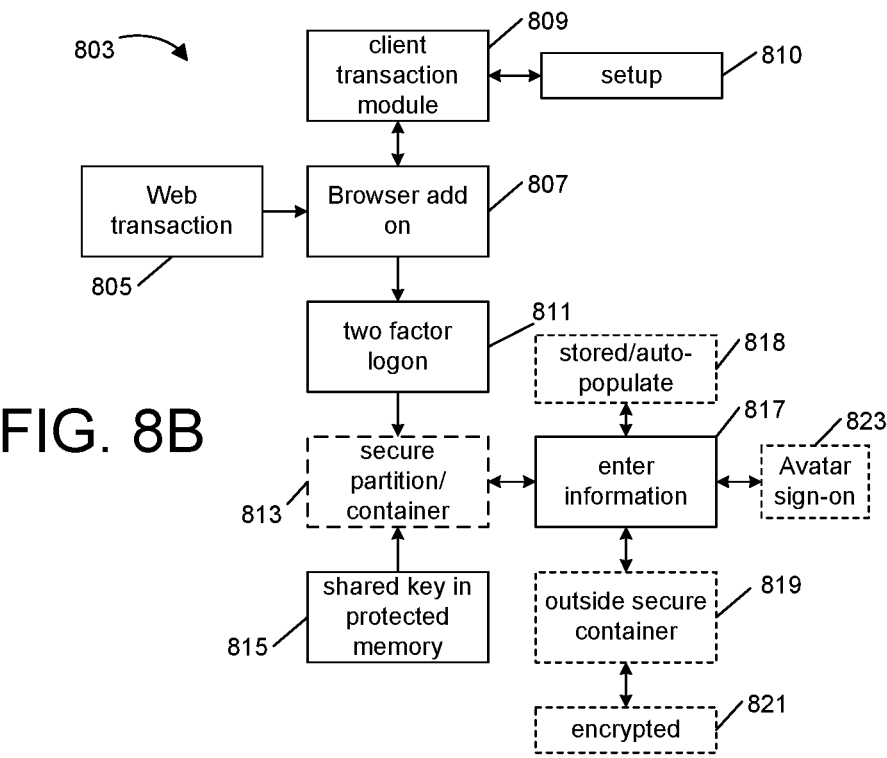
FIG. 8A shows an exemplary display screen associated with an electronic transaction.
FIG. 8B is a flow diagram used to narrate a process by which a client securely communicates with a destination using avatars as described herein.

FIG. 8A shows one example of a hypothetical web page 801 display that might be presented on a display of a digital device for someone visiting a site or otherwise receiving a form that accepts avatars using the techniques presented herein. The web page as a typical browser display, for example, having a location bar that displays a uniform resource locator address (URL), with back, search and refresh functions, and that displays content defined by a digital file retrieved from the URL. The content depicted in this example includes a number of form fields for receiving a challenge, a credit card type, a credit card number, a card validity date and CCV, a cardholder name, a cardholder billing address, cardholder phone number and an identifier of the site or company being visited. [Note again that, in one embodiment, each credential displayed in its designated form field can be majority-masked (that is, displayed in a manner where most of its digits/letters replaced by masking characters such as an asterisk), to safeguard against an attack by the breach security-exploit, for example.] The content in this example can be defined using html code or other suitable script and, notably, displays in the lower right hand corner a button for "avatar sign-on," signifying that the client or end-user (e.g., "Bob") can select this button and trigger avatar submission on sequential, batched basis. As noted earlier, this is not the only design possible, and other designs may seek to activate each field and submit an avatar when and if the user presses "enter" after typing a value. Also, this hypothetical web display depicts a challenge selected and textually entered by Bob, for example "greetings from Bob's smartphone 10 Nov. 2015." After sending the avatar, when Bob's domain receives the forwarded avatar, it is this same value that should be produced following decryption to verify that the particular digital device in fact originated the avatar in question. Once again, this is not required for all embodiments.

FIG. 8B provides additional information 803 regarding avatar processing by a digital device, using once again the hypothetical example of Bob's smart phone. When an owner of the digital device visits a site, scans a bar code or otherwise receives information soliciting the submission of avatarized information (805), software operating on the digital device (e.g., as a service, plugin, executable or other software, 807) processes content entered into or stored on the digital device and submits it for avatarization. As denoted by numeral 809, this functionality can be part of a client transaction module (809) which, when installed, configures a setup process 810 to also install software components for communication, avatarization, encryption and so forth, as has been described previously. In one embodiment, the client (i.e., the owner of the digital device) can stored credit card and other information directly on the digital device for automatic field pre-population (818) and, to protect this information (or to control access to the client transaction module generally), the client transaction module can optionally require two factor logon 811. As already stated, the software can optionally implement a secure partition (813) with a shared key (installed by the client transaction module as previously mentioned) stored in a protected manner (815). Generally speaking, in such a framework, it is possible for execution of the client transaction module or its components to be restricted such that they can only be executed by a specific processor or processor core with signed code (i.e., boot code and application code) and memory that cannot be shared by applications executed outside the specific processor or processor core; the shared secret key is preferably kept in such a space, in a manner that cannot be accessed by other program instructions and in a manner such that only raw data to be encrypted and the result of encryption are exchanged with the protected space. When and as a user enters information (817), for example, by selecting prepopulated fields or from a drag down list of previously used values matching the field type, this information can be accessed by the specific processor and then processed inside protected space in order to create avatars. As noted by numerals 819 and 821, raw data used for avatarization (e.g., memorized fields) can optionally be stored outside of the protected space, for example, in encrypted form. When and as a user views a form that calls for one of these entries, the client transaction module retrieves the pertinent value(s), decrypts those values as appropriate, and displays them for user selection; when and as a user selects a specific value, that value can then be avatarized as described herein. FIG. 8B also shows an optional avatar sign-on function 823 at the right side of the FIG., representing user-selected execution of the avatar function, e.g., field-by-field or on a batched basis as has previously been described. In an embodiment where a PSK is not generated until a user selects the avatar sign-on function, the PSK exchange can be performed before user-selected fields are avatarized (e.g., to permit the PSK to then be applied to avatarized private information, as described above).

Figure 8C:
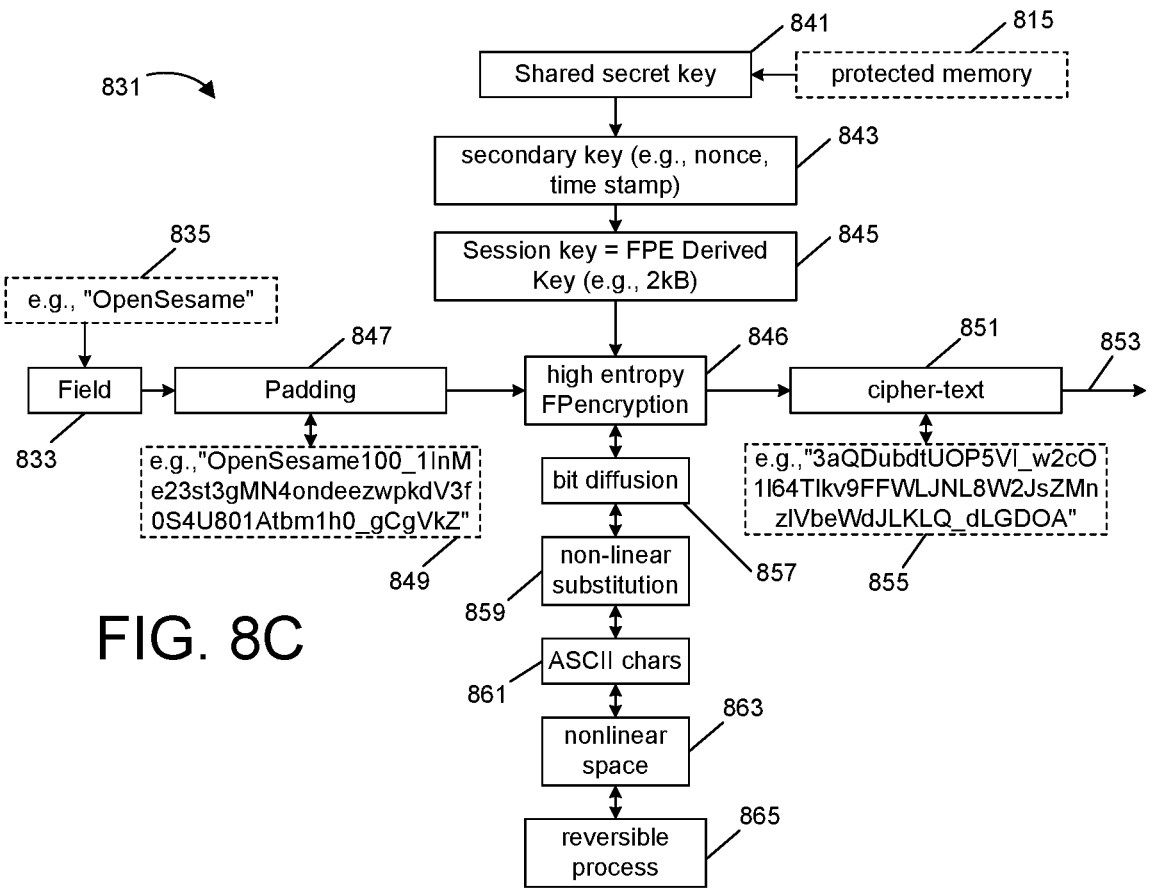
FIG. 8C is a flow diagram used to describe encryption processes used in various embodiments, to convey private information in a secure manner that can be authenticated.

FIG. 8C provides an illustrative diagram 831, used to explain optional encryption functions used in avatarization. More specifically, it is assumed for purpose of this example that the user ("Bob") has entered private information consisting of a password "OpenSesame" (835) and that this information is to be conveyed to a bank ("AcmeBank.com") in order for the user to view his accounts online; in a typical transaction, other information (e.g., account number) might also be conveyed, but the focus of FIG. 8C is on a specific field 833 (e.g., "user password") in order to illustrate some optional cryptographic processes. As noted earlier, the encryption software typically uses a shared secret key of the device (e.g., key$_{Bob}$, 841), once again, optionally stored in protected memory 815. The encryption software also in this example generates a secondary key 843, comprising a nonce such as a time stamp and also identifies a session key (PSK) 845, which it will use in a high entropy format preserving (FP) encryption process 846.

To prepare the user field ("OpenSesame") for encryption, the software pads this field as appropriate, in this example, to create a 64-ASCII character field of e.g., "OpenSesame100_1InMe23st3gMN4ondeezwpkdV3f0-S4U801Atbm1h0_gCgVkZ"

which will then form an operand of the encryption process. By "format preserving," it is meant that in association with this encryption methodology, the encryption output will represent the same number space as the input and thus also in this example be represented as a 64-character string. By "high entropy," it is meant that the encryption process is robust in generating outputs which differ widely in value in the encrypted number space, and are capable of producing values distributed throughout the encrypted number space, based on variation in the input values. Note also the padding process can be a combination of applying a high-randomness padding and a key-driven MAC (Message Authentication Code), achieving both heightening of the source entropy and tamper/forgery-resistance. In one embodiment, the encryption process involves a high degree of bit diffusion (857) such that slightly varying inputs (e.g., in a single character) will propagate to difference in many characters of the output, rendering it more difficult to derive either the key or the input text with only knowledge of the output. As represented by numeral 859, in one embodiment, a non-linear substitution step is used, whereby a sequence of input values is mapped on a non-linear basis to a sequence of output tables, e.g., through the use of a lookup table. Per numeral 861, in one embodiment, encryption inputs and outputs are restricted to the ASCII character space (or an even smaller, URL-safe subset) rendering it relatively easy to express input or output values as a URL or text string. Per numeral 863, the input number space and output number space are not restricted to binary values; see the copending U.S. patent application Ser. No. 14/831,070, incorporated herein by reference, for details on exemplary non-binary space, format preserving encryption process. As noted by numeral 865, the encryption process is advantageously a completely reversible process such that, given knowledge of the keys used to perform encryption (e.g., the shared secret key, secondary key, PSK and so forth, as appropriate), it is possible to completely recover the input string from cipher text 851 output by the encryption process. Note that these parameters are general parameters, and any conventional encryption process suitable for use with these parameters may be applied to perform encryption. In one embodiment, AES-256 or a similar encryption protocol is used for encryption, and in another embodiment, another encryption protocol can be used, for example, a permutation-vector-shuffle technique, as descried in U.S. patent application Ser. No. 14/831,070. As seen at the right-hand side of FIG. 8C, an exemplary, hypothetical output 853 might consist of the cipher text "3aQDubdtUOP5VI_w2cO1I64TIkv9FFWUNL8W2Js-ZMnzIVbeWdJLKLQ_dLGDOA"
(855) which will form the avatar payload in this example.

Figure 8E:
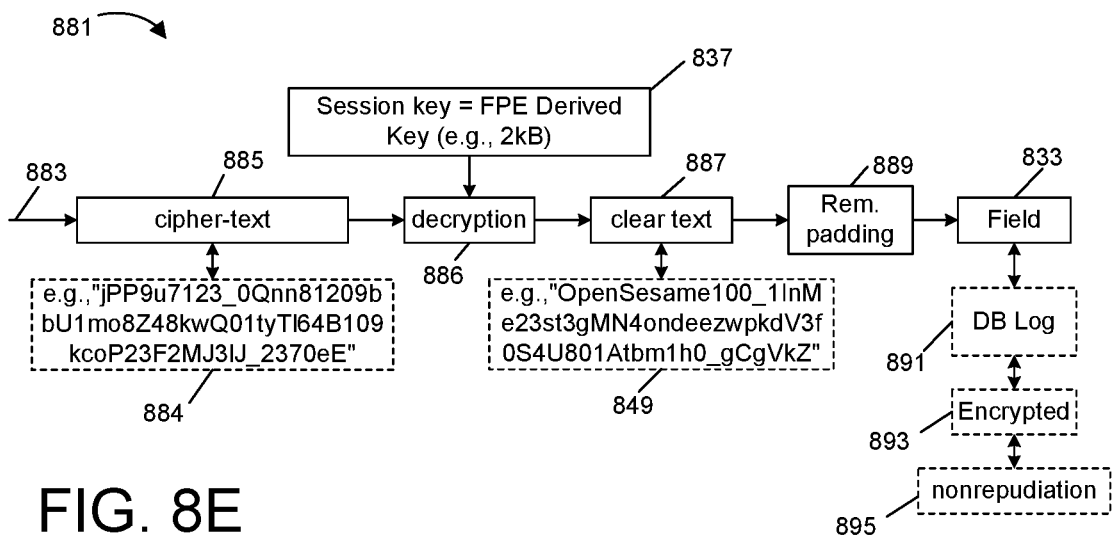
FIG. 8E is a flow diagram used to describe decoding of the private information introduced with respect to FIG. 8C, e.g., by Acme.
Figure 8D:
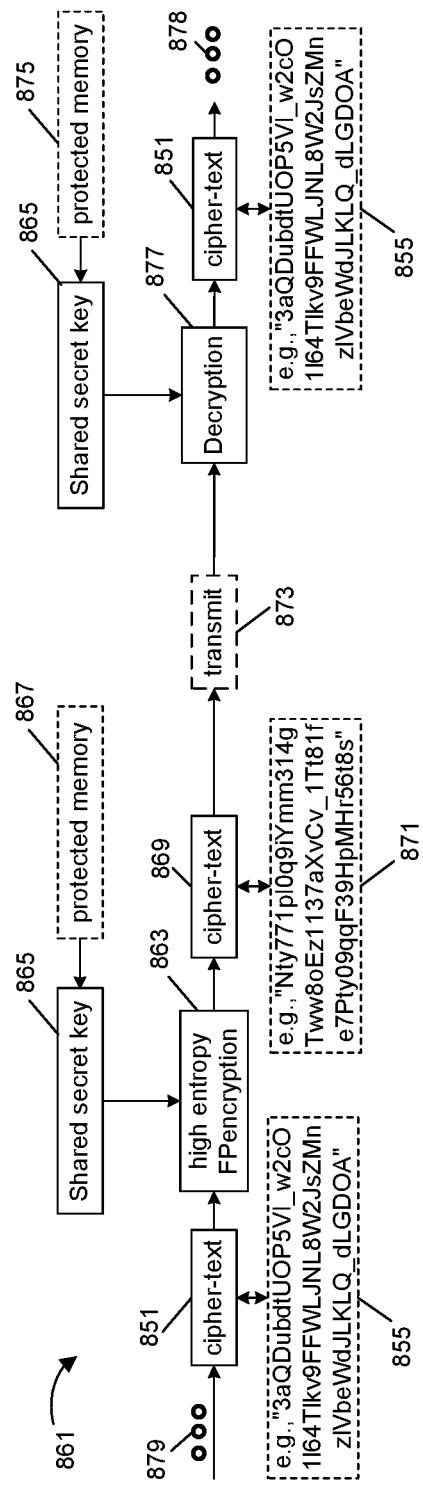
FIG. 8D is a flow diagram used to describe loop-based routing, for decoding of the private information introduced with respect to FIG. 8C.

FIG. 8D provides an illustrative diagram 861 representing processing of this avatar payload 851 by a destination device (e.g., a server of AcmeBank.com). This cipher text is received as an input (879), for example, via an untrusted network connection. As noted earlier, private information is advantageously doubly-avatarized, a first time using the PSK, and the second time using the shared secret key (841) stored on the originating device. The destination device does not possess this latter key (841), hence it cannot decode the avatar payload. It therefore also performs a high entropy FP encryption process 863, using its own secret key (865), optionally stored in its own protected memory 867. The result is a new cipher-text string 869, hypothetically-illustrated in FIG. 8D to consist of the 64-character text "Nty771pI0q9iYmm314gTww8oEz1137aXyCv_1Tt81f-e7Pty09qq F39 HpM Hr56t8s"
(871). This information is transmitted (873) through the secure network by the destination device, and it arrives at a destination node following each hop where it is decrypted (877) using the shared secret key used to encrypt it, in the illustrated case, the shared secret key used by the destination device (AcmeBank.com's server), 865. Per numeral 875, this node (e.g. a server in the cloud) also is caused to store this key (and other shared keys used for communications) in a protected manner, such as protected memory 875. The decryption process recovers the avatar, i.e., the cipher-text (851) of "3aQDubdtUOP5VI_w2cO1I64TIkv9FFWUNL8W2Js ZMnzIVbeWdJ LKLQ_dLGDOA"
(855), but it cannot decode the avatar payload. The node then performs encryption using another shared key and a similar format preserving encryption process, to forward a re-encrypted avatar onto the next node, and so forth.

Ultimately, the avatar payload is received via the secure network at the domain server for the originating digital device, i.e., the domain for Bob's smart phone, and is partially decrypted and returned to the destination device. FIG. 8E provides an illustrative depiction 881 of processes taken to fully decrypt the avatar payload. Note first that the incoming partially-de-avatarized payload will be received via a secure network connection and thus is first decrypted according to the processes seen at the right-half of FIG. 8D, e.g., as represented by numeral 877, to recover a payload exemplified by cipher-text 884 and text characters 885. This payload is then subjected to the secondary decryption processes numeral 886, which applies the private session key (PSK), 837, to fully decrypt the payload and thus obtain the clear text value 887 which matches the original padded password information 849. The software then applies a padding and MAC removal process (889) to recover the original private information ("OpenSesame") and store this in association with the pertinent field for the pertinent sessions/webform (833).

FIG. 8E shows several further optional functions that can be performed by software at the destination device (e.g., AcmeBank.com). First, per numeral 891, all information can optionally be logged, including the incoming encrypted data, the decoded information, any pertinent private session key, and potentially other information. [This is one reason why it is advantageous, depending on design, to use an initial exchanged key, e.g., as represented by the logarithmic notation $G^{AB}$, to exchange a PSK selected according to a different process than $G^{AB}$, e.g., such that it is infeasible that two keys for respective sessions between the same two entities will be similar]. Optionally, this logged information is also further encrypted (893) to deter against hacking of the destination device (e.g., attempts to hack AcmeBank.com's secure systems) so as to obtain private information or credentials following de-avatarization. As noted by numeral 895, such logging techniques facilitate nonrepudiation of transactions, e.g., the logged data is advantageously of such a nature to prove that data necessarily was provided by Bob's device; when combined with validation processes for federated credentials, such techniques provide a credible mechanism for authenticating that one presenting credentials is truly its owner. Additionally, forensic single or double non-repudiation can be accomplished, in one embodiment, by assigning an asymmetric private-key (with a corresponding public-key) and a private symmetric-KDF key for each party or device (e.g., such as Bob and Acme or their respective devices).

As should be apparent, these techniques provide powerful mechanisms for mitigating online fraud and identity theft. Should someone not in possession of Bob's device attempt to use Bob's credentials, the validation service discussed above provide a means for detecting fraudulent usage, e.g., because software run by the validation service detects if a credential is duplicated already in the credentials database (e.g., and/or is already associated with another email address, device, etc.). In the event that Bob loses his smart phone, the validation service can establish means for permitting Bob to revoke his shared secret key, and thus prevent a thief from using the avatar system to process or otherwise validate those credentials. Note that this process does not require Bob to revoke his underlying credentials (e.g., credit card numbers), which can simply be re-registered using a new user ID. Many other techniques and advantages will occur to those of ordinary skill in the art.

In many of the examples above, the model of an instore or online transaction was used, but clearly the described techniques can be applied in a myriad of different situations, for example, to loan applications and other situations involving forms submission or credentials presentation. To cite an illustrative example, the described techniques can be applied to site access entry restriction, e.g., a secure site entry door mounts a QR code, which is then scanned in the manner referenced above by a user's smart phone; that smart phone transmits an avatar to the site security system, which then processes the avatar using the techniques referenced above, decoding the avatar using a trusted network connection and a key shared only with the user's domain server. Upon receiving de-avatarized information matching an electronic security credential assigned to the user, the system unlocks the site security door, optionally capturing a picture of the user as he or she enters the door. An extension of this model can also be used for example to provide boarding passes for airline travel, e.g., via loop-based authentication flow communication with a point-of-departure electronic terminal. As yet another example, it is not necessary for all embodiments that a user transmit avatars electronically; in another application, a user employs the client transaction module software on his or her digital device, which then generates a token which is displayed to the user. The user or a third party then enters that token manually on to a form or electronic keypad. For example, in filling out a loan application, a user can enter a token generated by his or her device, where the token is an electronically generated avatar as described herein, but is manually entered by the user. The token is then later keyed into an electronic system (e.g., by one processing an application, such as a loan application), and the system then de-avatarizes the information as described above; such a methodology helps protect sensitive information (e.g., social security number) from exposure to untrusted individuals, e.g., employees at a bank—the correct, decoded information can be generated electronically, transparently, and the true, decoded value stored in secure computer memory.

The loop-based flow techniques described above directly address some of the root weaknesses in today's retail transaction processing systems, especially including the presence of anonymous parties. Because a secure network, predicated on overlapping trust domains and loop-based decoding and authentication permits verification of identity and association with a federated credential without ambiguity, there are effectively no anonymous parties, which makes it easier to identify and isolate sources of unethical behavior from a systematic perspective. Also, the described techniques also benefit individual users by helping to mitigate against the proliferation of account names and complex passwords, and against the associated typical user response of selecting easy-to-remember, correlated passwords. As noted above, some embodiments permit a user to locally store credentials and private information (e.g., in encrypted form, with client transaction module software optionally encrypting this information as stored) while using it to prepopulate fields in forms or otherwise providing that information for selection; the described techniques provide encrypted information in the form of avatars over untrusted connection, with an independent "loop path" based on overlapping trusted network connections relied upon to decode information and provide decoded information to the intended recipient, in many cases with validation of provided information as associated with the true owner. It is thus less necessary for users to remember a multitude of secure passwords or, for that matter, to require the use of a password in an online transaction; the described network permits authentication of all parties to a transaction, so there is less need for passwords as a secondary authentication factor to restrict for account access. Simply stated, using the loop-based authentication techniques described above achieves the goals of secure password usage without requiring a secure password, because it reliably guarantees that "Bob" is indeed a party to a transaction, because it reliably guarantees that Bob is in fact the owner of a federated credential, and because it uses a process that is resilient to unethical intermediaries.

As noted, the techniques discussed above also help facilitate non-repudiation. That is, repudiation of completed retail transactions typically costs businesses billions of dollars per year. This can happen when a thief makes retail purchases with a stolen credential and the credential's owner denies making the purchase; it can also happen when the credential's owner purchases merchandise and then denies the purchase, i.e., when the owner commits "friendly fraud." Use of the loop-based techniques presented above help reduce both types of fraud by making it more difficult for thieves to misappropriate the federated credentials of another, and by making it more difficult for a user (e.g., Bob) to deny authenticity of a transaction that was consummated using his phone, his unique ID (e.g., his email address and so forth).

Finally, the described techniques also facilitate denial of system access to notoriously unreliable entities (e.g., entities that have committed fraud or theft in the past). As noted above in connection FIG. 2, a validation service can maintain a reputation/history database which it uses to identify entities of poor reputation; when such an entity attempts to communicate using the loop-based system described above, or otherwise attempts to register and become a part of the network, the validation service (e.g., hub) can check this database for names, IP addresses, email addresses and other heuristics, and can selectively deny registration/access/system usage to these entities. This capability also applies to merchants of poor reputation.

Figure 9A:
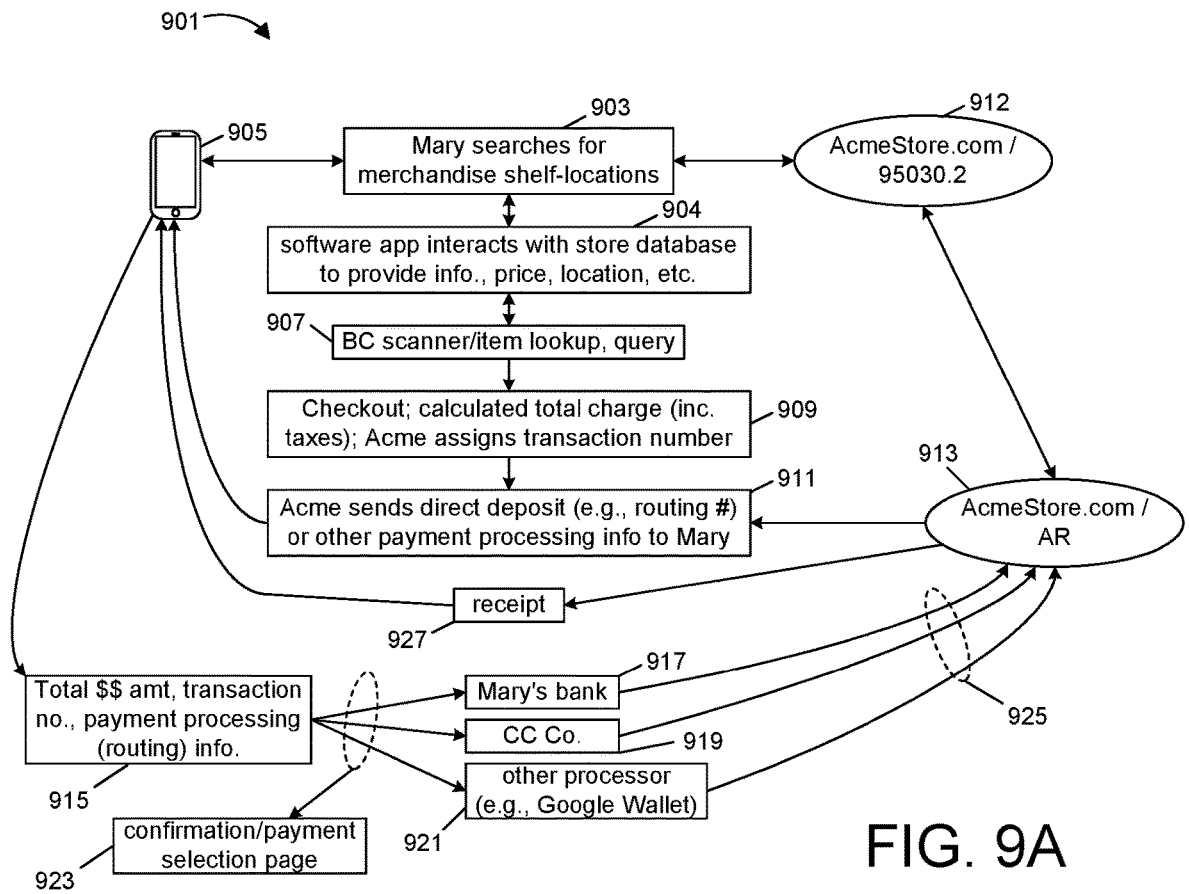
FIG. 9A is an illustrative diagram used to explain a hypothetical retail point-of-sale transaction.
Figure 9B:
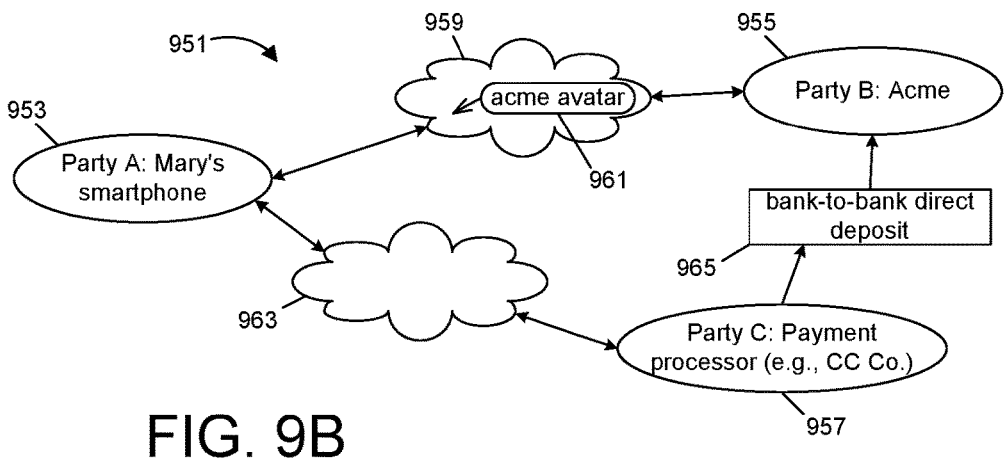
FIG. 9B is an illustrative diagram used to discuss loop-based authentication flow in connection with the hypothetical transaction of FIG. 9A.

FIGS. 9A and 9B are used to illustrate yet another hypothetical commercial transaction scenario involving a point of sale process. More specifically, it will be assumed that a first entity (e.g., "Mary") wishes to make an in-store of retail items aided by some of the principles discussed above.

The process is generally referenced by numeral 901 in FIG. 9A. As depicted for this hypothetical, Mary shops for merchandise at various locations in the store (903); if desired, this shopping can be assisted (904) by a software application on Mary's smart phone (905) which assists Mary with finding items within the store, for example, optionally relying on RFID or Bluetooth position identification systems within the store. The application provides for a bar code scanning mechanism to look up price (907) and to confirm provisional addition of items into Mary's virtual "cart" (i.e., for purposes of later checkout). When this checkout occurs, as denoted by numeral 909, the application calculates total charge (including taxes as appropriate) and is assigned a transaction number by the merchant (e.g., "Acme"). At this time, the merchant also sends to Mary's smart phone direct deposit (or other automated payment information), in association with the transaction number (911).

As denoted by the right side of the FIG., the merchant (Acme) in this example has at least one in store computer or transaction server 912, which is further coupled to an accounts receivable system 913. The computer/server in this example is responsible for serving price and order information to Mary's smart phone, while the accounts receivable system receives a handoff from the computer/server and handles payment confirmation and transaction receipt generation. Note that in some embodiments, the functions can be integrated on a single computer or otherwise handled by a single software package.

As indicated by numeral 915, when Mary's smart phone receives the transaction number, transaction amount and automated payment information, it then transmits this information directly to a payment processor, for example, to Mary's bank 917, to Mary's credit card company 919 or to another processor (e.g., PayPal, Google Wallet, or another service) 921. Such an election (i.e., credit card selection) can be made part of a transaction checkout page which asks the particular entity (e.g., Mary) to confirm purchase and to confirm the initiation of funds transfer and/or payment clearance (923). Whichever payment methodology is selected, as indicated by arrows 925, the pertinent payment processor then effects automated electronic transfer of funds to the merchant (Acme), which causes the accounts receivable system to consummate the transaction and generate a receipt 927; for example, this receipt can be structured to display a bar code or other information at a store's exit to perform inventory check or for other purposes, or to permit the user (Mary) to print out a hard copy itemized receipt at a later time.

FIG. 9B provides an illustrative diagram 951 that illustrates the use of loop-based authentication flow for two different sets of communications relative to the example just discussed. FIG. 9B graphically depicts three different parties, including Party A (i.e., represented by Mary's smart phone 953), Party B (i.e., represented by Acme's transaction server and/or accounts receivable system 955), and Party C (i.e., represented by a network for Mary's selected credit card processor 957, e.g., a credit card company). More specifically, loop-based authentication flow, and the sending of avatars is first performed in a loop represented by a first cloud icon 959; that is, Mary's smart phone (953) adds selected items to a virtual transaction cart by sending avatars to Acme's system (955). Loop-based authentication if desired can optionally also be used in reverse (961), that is, with Acme's system sending avatars to Mary's cell phone and to so-convey items like the electronic information needed to consummate payment (e.g., routing information for Acme's bank and/or accounts receivable system) and the aforementioned receipt (i.e., once the transaction has been consummated). Per numeral 963, a second cloud icon represents a second authentication loop used by Mary to send federated credentials and transaction information to a payment processor; pursuant to the principles discussed earlier, an encrypted avatar can be sent to the payment processor as a destination device, and then routed through a trusted secure network to Mary's domain, decoded to provide a decrypted federated credential, and then returned to the selected payment processor to perform payment clearance. In this example, the payment processor can itself act as the hub or, alternatively, this function can be provided by a third party service (e.g., by a network services provided such as Microsoft or Google). Alternatively, such a payment processor can directly act as the domain for the Party A (e.g., with Mary routing the avatar for payment through the Internet (e.g., via a public wifi access point provided by Acme) and with the payment processor decoding the avatar and then immediately effectuating funds transfer without sending decrypted credit card information anywhere. Other examples will also occur to those skilled in the art. Whichever implementation is relied on, the payment processor then, pursuant to numeral 965, effectuates funds transfer and associated confirmation, which is communicated to Party B and used to generate a receipt, as previously discussed.

Note some of the advantages to the scheme just discussed: First, a user (such as Mary in this example) need never expose his or her credential (e.g., credit card) to a human operator, even to an employee of Acme; second, the user in this example never has to wait in a line, e.g., a transaction can be initiated and consummated purely at the user's convenience, with the user simply displaying an e-generated checkout receipt at the store's exit, to the extent this is required for inventory control purposes; finally, depending on implementation, a payment processor can process and clear transactions without ever needing to transmit decrypted credentials to a third party.

Clearly, the described techniques can be implemented to provide a wide variety of e-commerce or other implementation scenarios; for example applications once again exist for secure site access and other types of transactions, as referenced earlier.

The foregoing description and in the accompanying drawings, specific terminology and drawing symbols have been set forth to provide a thorough understanding of the disclosed embodiments. In some instances, the terminology and symbols may imply specific details that are not required to practice those embodiments. The terms "exemplary" and "embodiment" are used to express an example, not a preference or requirement.

Various modifications and changes may be made to the embodiments presented herein without departing from the broader spirit and scope of the disclosure. Features or aspects of any of the embodiments may be applied, at least where practicable, in combination with any other of the embodiments or in place of counterpart features or aspects thereof. Accordingly, the features of the various embodiments are not intended to be exclusive relative to one another, and the specification and drawings are to be regarded in an illustrative rather than a restrictive sense.

We claim:

1. An apparatus comprising instructions stored on non-transitory machine-readable media, the instructions when executed to cause at least one processor of a first party, in connection with a sales transaction between the first party and the second party which is being processed by the first party, to:
   receive first information representing payment information of a second party encrypted using an encryption protocol shared between the second party and a third party;
   receive information identifying the third party;
   route the encrypted first information to the third party;
   receive, responsive to the routed, encrypted first information, payment information from the third party provided in dependence on processing of the encrypted first information by the third party using the encryption protocol shared between the second party and the third party;
   establish a shared private session key with a fourth party, encrypt the payment information received from the third party using the private session key established with the fourth party; and
   forward the encryption of the payment information received from the third party to a network destination, wherein the encryption of the payment information received from the third party is to be decrypted by the fourth party according the established private session key, and wherein the processing of the sales transaction by the first party is dependent on the payment information received from the third party.

2. The apparatus of claim 1, wherein:
   the at least one processor of the first party is to receive the encrypted first information via a network comprising at least one of the Internet and a wireless Bluetooth connection;

the information identifying the third party comprises header information; and the instructions, when executed, are further to cause the at least one processor of the first party to use the header information to identify the third party, and to route the encrypted first information for delivery to the identified third party.

3. The apparatus of claim 1, wherein:

the instructions, when executed, are further to cause the at least one processor of the first party to store a network map, the network map identifying a machine that shares a first encryption protocol with the first party and that also shares a second encryption protocol with a destination in the network that couples the machine with the third party;

the instructions, when executed, are to cause the at least one processor to identify the machine from the network map, to identify the first encryption protocol dependent on the identified machine, to further encrypt the first information using the first encryption protocol, and to transmit the further encrypted first information to the machine; and each encryption protocol, including the first encryption protocol and the second encryption protocol, comprises one of a respective encryption key and a respective encryption algorithm.

4. The apparatus of claim 1, wherein the instructions, when executed, are further to cause the at least one processor to:

further encrypt the received, encrypted first information using an encryption protocol shared between the first party and another entity, wherein the other entity is one of (i) the third party and (ii) a fifth party that is to receive the encrypted first information from the first party and is to forward the encrypted first information from the first party for delivery to the third party; and receive an information return from the other entity in a manner that is encrypted according to the encryption protocol shared between the first party and the other entity; and decrypt the information return using the encryption protocol shared between the first party and the other entity, to recover the payment information provided from the third party in dependence on processing of the encrypted first information by the third party.

5. The apparatus of claim 4, wherein:

at least one of the first information and the payment information provided from the third party in dependence on processing of the first information by the third party comprises a time stamp and one of a credit card number and account number; and the network destination comprises at least one of a payment processor website and a banking website.

6. The apparatus of claim 1, wherein the instructions, when executed, are further to cause the at least one processor to:

encrypt information of the first party using an encryption protocol shared between the first party and the fourth party;

transmit the encrypted information of the first party to the fourth party;

receive encrypted information of the fourth party; and obtain the private session key in dependence on the encrypted information of the fourth party and the information of the first party, wherein the fourth party is to obtain the private session key in dependence on the information of the fourth party and the encrypted information of the first party.

7. The apparatus of claim 6, wherein the instructions, when executed, are further to cause the at least one processor to computationally combine the encrypted information of the fourth party and the information of the first party to generate the private session key.

8. The apparatus of claim 6, wherein the instructions, when executed, are further to cause the at least one processor to select the private session key, encrypt the private session key using an encryption key that is dependent on a combination of the encrypted information of the fourth party and the information of the first party, and transmit the encrypted private session key to the fourth party, wherein the fourth party is to decrypt the encrypted private session key using the information of the fourth party and the encrypted information of the first party.

9. The apparatus of claim 1, wherein:

the instructions, when executed, are further to cause the at least one processor to receive the encrypted first information in the form of a communication having a first level of encryption, to further encrypt the communication so as to add a second level of encryption, and to transmit the communication having the second level of encryption to a wide-area-network recipient;

the wide-area-network recipient is to remove the second level of encryption added by the at least one processor of the first party, and the third party is to perform at least one of removal of the first level of encryption and authentication of the first information;

the recipient is one of the third party and a fifth party; and the instructions, when executed, are to cause the at least one processor of the first party to receive from the recipient the payment information from the third party provided by the third party in dependence on processing of the first information by the third party.

10. The apparatus of claim 1, wherein:

the instructions, when executed, are further to cause the at least one processor to route the encrypted first information to the third party in a manner accompanied by a sales transaction identifier.

11. A method implemented by at least one processor of a first party, in connection with a sales transaction between the first party and a second party which is being processed by the first party, the method comprising:

receiving first information representing payment information of a second party encrypted using an encryption protocol shared between the second party and a third party;

receiving information identifying the third party;

routing the encrypted first information to the third party;

receiving, responsive to the routed, encrypted first information, payment information from the third party provided in dependence on processing of the encrypted first information by the third party using the encryption protocol shared between the second party and the third party;

establishing a shared private session key with a fourth party;

encrypting the payment information received from the third party using the private session key established with the fourth party; and forwarding the encryption of the payment information received from the third party to a network destination, wherein the encryption of the payment information received from the third party is to be decrypted by the fourth party according the established private session key, and wherein the processing of the sales transaction by the first party is dependent on the payment information received from the third party.

12. The method of claim 11, wherein:
receiving the encrypted first information comprises receiving the encrypted first information via a network comprising at least one of the Internet and a wireless Bluetooth connection;
the information identifying the third party comprises header information; and
the method further comprises using the header information to identify the third party, and routing the encrypted first information for delivery to the identified third party.

13. The method of claim 11, wherein:
the method further comprises storing a network map, the network map identifying a machine that shares a first encryption protocol with the first party and that also shares a second encryption protocol with a destination in the network that couples the machine with the third party, identifying the machine from the network map, identifying the first encryption protocol dependent on the identified machine, further encrypting the first information using the first encryption protocol, and transmitting the further encrypted first information to the machine; and
each encryption protocol, including the first encryption protocol and the second encryption protocol, comprises one of a respective encryption key and a respective encryption algorithm.

14. The method of claim 11, further comprising:
further encrypting the received, encrypted first information using an encryption protocol shared between the first party and another entity, wherein the other entity is one of
(i) the third party and
(ii) a fifth party that is to receive the encrypted first information from the first party and is to forward the encrypted first information from the first party for delivery to the third party; and
receiving an information return from the other entity in a manner that is encrypted according to the encryption protocol shared between the first party and the other entity; and
decrypting the information return using the encryption protocol shared between the first party and the other entity, to recover the payment information provided from the third party in dependence on processing of the encrypted first information by the third party.

15. The method of claim 14, wherein:
at least one of the first information and the payment information provided from the third party in dependence on processing of the first information by the third party comprises a time stamp and one of a credit card number and account number; and
the network destination comprises at least one of a payment processor website and a banking website.

16. The method of claim 11, further comprising:
encrypting information of the first party using an encryption protocol shared between the first party and the fourth party;
transmitting the encrypted information of the first party to the fourth party;
receiving encrypted information of the fourth party; and
obtaining the private session key in dependence on the encrypted information of the fourth party and the information of the first party, wherein the fourth party is to obtain the private session key in dependence on the information of the fourth party and the encrypted information of the first party.

17. The method of claim 16, wherein the method further comprises computationally combining the encrypted information of the fourth party and the information of the first party to generate the private session key.

18. The method of claim 16, further comprising selecting the private session key, encrypting the private session key using an encryption key that is dependent on a combination of the encrypted information of the fourth party and the information of the first party, and transmitting the encrypted private session key to the fourth party, wherein the fourth party is to decrypt the encrypted private session key using the information of the fourth party and the encrypted information of the first party.

19. The method of claim 11, wherein:
the method further comprises receiving the encrypted first information in the form of a communication having a first level of encryption, further encrypting the communication so as to add a second level of encryption, and transmitting the communication having the second level of encryption to a wide-area-network recipient;
the wide-area-network recipient is to remove the second level of encryption added by the at least one processor of the first party, and the third party is to perform at least one of removal of the first level of encryption and authentication of the first information;
the recipient is one of the third party and a fifth party; and
the method further comprises receiving from the recipient the payment information from the third party provided by the third party in dependence on processing of the first information by the third party.

20. The method of claim 11, wherein:
the method further comprises routing the encrypted first information to the third party in a manner accompanied by a sales transaction identifier.

* * * * *